(12) United States Patent
Collins et al.

(10) Patent No.: US 8,321,274 B2
(45) Date of Patent: *Nov. 27, 2012

(54) ADVERTISER ALERTING SYSTEM AND METHOD IN A NETWORKED DATABASE SEARCH SYSTEM

(75) Inventors: Robert J. Collins, Carlsbad, CA (US); Paul Joseph Apodaca, Carlsbad, CA (US); Adam J. Wand, Carlsbad, CA (US); Claude Jones, III, San Marcos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 730 days.

This patent is subject to a terminal disclaimer.

(21) Appl. No.: 11/413,535

(22) Filed: Apr. 28, 2006

(65) Prior Publication Data
US 2007/0033103 A1  Feb. 8, 2007

Related U.S. Application Data

(60) Provisional application No. 60/703,904, filed on Jul. 29, 2005.

(51) Int. Cl.
*G06Q 30/00* (2012.01)
(52) U.S. Cl. .................. 705/14.43; 705/14.42
(58) Field of Classification Search .............. 705/14, 705/14.43, 14.42
See application file for complete search history.

(56) References Cited

U.S. PATENT DOCUMENTS

| | | | |
|---|---|---|---|
| 5,283,731 A | 2/1994 | Lalonde et al. | |
| 5,659,732 A | 8/1997 | Kirsch | |
| 5,717,923 A | 2/1998 | Dedrick | |
| 5,724,424 A | 3/1998 | Gifford | |
| 5,724,521 A | 3/1998 | Dedrick | |
| 5,724,524 A | 3/1998 | Hunt et al. | |
| 5,748,954 A | 5/1998 | Maudlin | |
| 5,752,238 A | 5/1998 | Dedrick | |
| 5,768,521 A | 6/1998 | Dedrick | |
| 5,778,367 A | 7/1998 | Wesinger, Jr. et al. | |
| 5,794,210 A | 8/1998 | Goldhaber et al. | |
| 5,826,241 A | 10/1998 | Stein et al. | |
| 5,848,396 A * | 12/1998 | Gerace ............................ | 705/10 |
| 5,848,397 A | 12/1998 | Marsh et al. | |

(Continued)

FOREIGN PATENT DOCUMENTS

CN    1279440 A    1/2001

(Continued)

OTHER PUBLICATIONS

"The Importance of Being Found" By: John Harrison; LIMRA's MarketFacts Quarterly; v24n1; pp. 76-86; Winter 2005.*

(Continued)

*Primary Examiner* — John Weiss
*Assistant Examiner* — Michael Stibley
(74) *Attorney, Agent, or Firm* — Brinks Hofer Gilson & Lione

(57) ABSTRACT

A system and method provide advertisement campaign information about an advertisement campaign to an advertiser. The system includes means for organizing advertisement campaign information into one or more ad groups and a web interface to receive advertiser inputs and provide system alerts about the advertisement campaign information to the advertiser. The system further includes a campaign data store configured to store advertisement campaign account data and an alerting system to produce the system alerts about performance of the advertisement campaign.

9 Claims, 6 Drawing Sheets

U.S. PATENT DOCUMENTS

| | | | |
|---|---|---|---|
| 5,848,407 | A | 12/1998 | Ishikawa et al. |
| 5,852,820 | A | 12/1998 | Burrows |
| 5,855,008 | A | 12/1998 | Goldhaber et al. |
| 5,862,223 | A | 1/1999 | Walker et al. |
| 5,864,845 | A | 1/1999 | Voorhees et al. |
| 5,864,846 | A | 1/1999 | Voorhees et al. |
| 5,903,882 | A | 5/1999 | Asay et al. |
| 5,918,014 | A | 6/1999 | Robinson |
| 5,920,854 | A | 7/1999 | Kirsch et al. |
| 5,920,859 | A | 7/1999 | Li |
| 5,996,006 | A | 11/1999 | Speicher |
| 6,078,866 | A | 6/2000 | Buck et al. |
| 6,125,361 | A | 9/2000 | Chakrabarti et al. |
| 6,269,361 | B1 * | 7/2001 | Davis et al. ......................... 707/3 |
| 6,285,987 | B1 | 9/2001 | Roth et al. |
| 6,301,567 | B1 | 10/2001 | Leong et al. ..................... 705/33 |
| 6,304,850 | B1 | 10/2001 | Keller et al. ....................... 705/5 |
| 6,658,485 | B1 | 12/2003 | Baber et al. ..................... 719/314 |
| 6,763,104 | B1 * | 7/2004 | Judkins et al. ........... 379/265.09 |
| 6,826,572 | B2 | 11/2004 | Colace et al. ................... 707/10 |
| 7,010,512 | B1 | 3/2006 | Gillin et al. ...................... 705/39 |
| 7,043,483 | B2 | 5/2006 | Colace et al. ................... 707/10 |
| 7,065,500 | B2 * | 6/2006 | Singh et al. ..................... 705/26 |
| 7,188,169 | B2 * | 3/2007 | Buus et al. ..................... 709/224 |
| 2002/0004735 | A1 | 1/2002 | Gross |
| 2002/0082914 | A1 | 6/2002 | Beyda et al. |
| 2002/0103698 | A1 | 8/2002 | Cantrell |
| 2004/0068435 | A1 | 4/2004 | Braunzel |
| 2005/0021403 | A1 | 1/2005 | Ozer et al. |
| 2005/0027594 | A1 | 2/2005 | Yasnovsky et al. |
| 2005/0267803 | A1 * | 12/2005 | Patel et al. ....................... 705/14 |
| 2006/0230029 | A1 * | 10/2006 | Yan .................................... 707/3 |

FOREIGN PATENT DOCUMENTS

| | | |
|---|---|---|
| EP | 1 067 731 A2 | 1/2001 |
| EP | 1 282 051 A1 | 8/2002 |
| EP | 1 282 059 A1 | 8/2002 |
| EP | 1 282 060 A2 | 8/2002 |
| JP | 2001-195491 | 7/2001 |
| JP | 2001-230886 | 8/2001 |
| WO | WO 97/22066 A | 6/1997 |
| WO | WO 00/16218 | 9/1999 |
| WO | WO 99/48028 | 9/1999 |
| WO | WO 01/01217 A2 | 6/2000 |
| WO | WO 00/41090 | 7/2000 |
| WO | WO00/58895 | 10/2000 |
| WO | WO 02/21292 A1 | 3/2002 |

OTHER PUBLICATIONS

Glaser, "Who Will GoTo.com", from OnlinePress.com, Feb. 1998.

Search Engine Watch, Feb. 21, 1998, "GoTo Sells Positions", obtained at the internet address http://www.searchenginewatch.com/news.html, Feb. 23, 1998.

Hilty, "GoTo.Hell—What Happens When On Line Search Engine Accepts Cash From Web Sites?" from http://www.ocweekly.com/link/archives/97/27/byte-3.11.98-1.html, Mar. 1998.

Press Release article titled "GoTo.com Announces First round of Financing, Totaling More Than $6 Million, Led by Draper, Fisher Jurvetson", Business Wire, dated May 19, 1998, printed from the Internet at <http://www.dialogclassic.com/main.vingw> on Nov. 8, 2000, 2 pages.

Jury findings in *Overture Services, Inc.* v. *FindWhat.com, Inc.*, U.S. District Court for the Central District of California, Southern Division, case No. SA CV 03-685-CJC (Ex), May 11, 2005, 13 pages.

Trial Decision in *Overture Services, Inc.* v. *FindWhat.com, Inc.*, U.S. District Court for the Central District of California, Southern Division, case No. SA CV 03-685-CJC (Ex), May 11, 2005, 1 page.

* cited by examiner

| | | | | | | | | 300 |
|---|---|---|---|---|---|---|---|---|
YAHOO! SEARCH MARKETING   WELCOME, CLAUDE.JONES [SIGN OUT, PREFERENCES]   ✉ SUPPORT CENTER  [?] HELP  [?] PRD

| DASHBOARD | CAMPAIGNS | REPORTS | ACCOUNT ADMINISTRATION |   | MASTER ACCOUNT | XYZ ELECTRONICS ▼ |

CAMPAIGN MANAGEMENT SEARCH — 304

XYZ ELECTRONICS — 306
ACCOUNT: XYZ ELECTRONICS #1234567890 ▼ — 308   [CREATE CAMPAIGN]

⚠ ALERTS: — 314    332 — VIEW ALL
ALL ALERTS ▼
— 318                                                    — 316
10/01/05   23 KEYWORDS DECLINED — 320
09/30/05   CREDIT CARD WILL EXPIRE IN 30 DAYS. PLEASE ENTER A
           NEW CARD - BLAH BLAH A REALLY LONG ALERT
09/30/05   AD REJECTED ON BASIS OF CONTENT
09/28/05   ANOTHER GENERAL ACCOUNT ALERT
09/15/05   YET ANOTHER ALERT

— 310
| PERFORMANCE | ACCOUNT SUMMARY | | |
|---|---|---|---|
| PERFORMANCE | CLICKS | ACQUISITIONS | REVENUE | COST |
| 154,213 | 24,213 | 1,213 | 62,325 | 32,325 |

CHART: IMPRESSIONS ▼
                                                    — 324
        322
200
100
  0
    10/1  10/3  10/5  10/7  10/9  10/11  10/13

— 328
| WATCHED CAMPAIGNS ▼ | | | | | | | | | | |
|---|---|---|---|---|---|---|---|---|---|---|
| NAME ▽ | BUDGET | IMPRESSIONS | CTR | CLICKS | AVG. CPC | ASSISTS | CONVERSIONS | CPA | REVENUE | ROAS | COST |
| CAMPAIGN1 | 2000.00 | 273,762 | .89 | 2,432 | 1.34 | 300,000 | 34 | 375.00 | 1,680.00 | 18% | 3,000 |
| CAMPAIGN1 | 2000.00 | 273,762 | .89 | 2,432 | 1.34 | 300,000 | 34 | 375.00 | 1,680.00 | 18% | 3,000 |

DISPLAY 25 ▼ LINES PER PAGE   — 312
                                SHOW: 10/01/05 TO 10/14/05 ☐ ☐
                                RESULTS 7-8 OF 9  <<FIRST <PREVIOUS | 3 4 5 | NEXT> LAST>>
— 330

ADVERTISER ALERTING SYSTEM AND METHOD IN A NETWORKED DATABASE SEARCH SYSTEM

RELATED APPLICATIONS

The present patent document claims the benefit of the filing date under 35 U.S.C. §119(e) of Provisional U.S. Patent Application Ser. No. 60/703,904, filed Jul. 29, 2005, the entirety of which is hereby incorporated herein by reference.

BACKGROUND

The present application relates generally to online advertising systems. More particularly, the present application relates to an advertiser reporting system and method in a networked database search system.

Users who advertise with an online advertisement service provider such as Yahoo! Search. Marketing typically manage various types of online advertising through the use of a user interface to an advertisement management system of the advertisement service provider. Traditionally, users have been able to perform operations with the user interface such as adding, editing, or removing advertisements from their account, or modifying various parameters associated with advertisements such as budget parameters or performance parameters.

Current to online advertisement service providers only allow users to get limited alerts on the status of their advertisements and accounts. A typical alert includes some identification of an account and a further indicator of a condition that has been met or failed, such as an account balance that has gone below a threshold. As online advertising has increased in popularity, users may have thousands of advertisements that need to be managed at any given time. Therefore, it is desirable to provide to a user an advertisement campaign system that allows users to flexibly, dynamically, and efficiently manage large groups of advertisements as defined by the advertiser rather than the advertisement service provider. One part of the solution is a system and method for providing alerts about advertisements and the advertiser's accounts.

BRIEF DESCRIPTION OF THE DRAWINGS

FIG. 3 is an example of one embodiment of a graphical user interface displaying advertisement campaign information;

FIG. 4 is a second example of one embodiment of a graphical user interface displaying advertisement campaign information;

FIG. 5 is an alert notification settings page 500;

DETAILED DESCRIPTION OF THE PRESENTLY PREFERRED EMBODIMENTS

Figure 5:
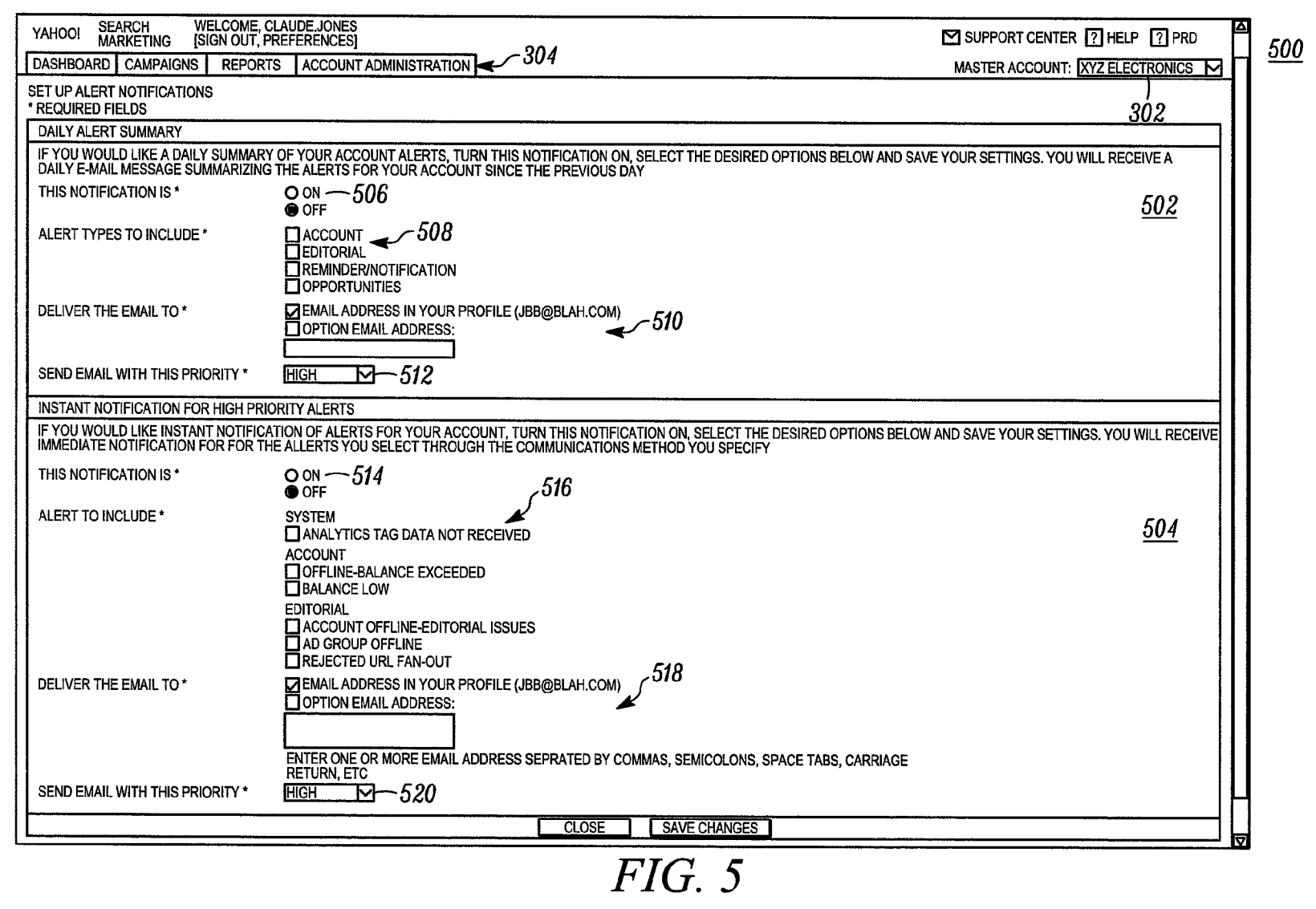
Figure 6:
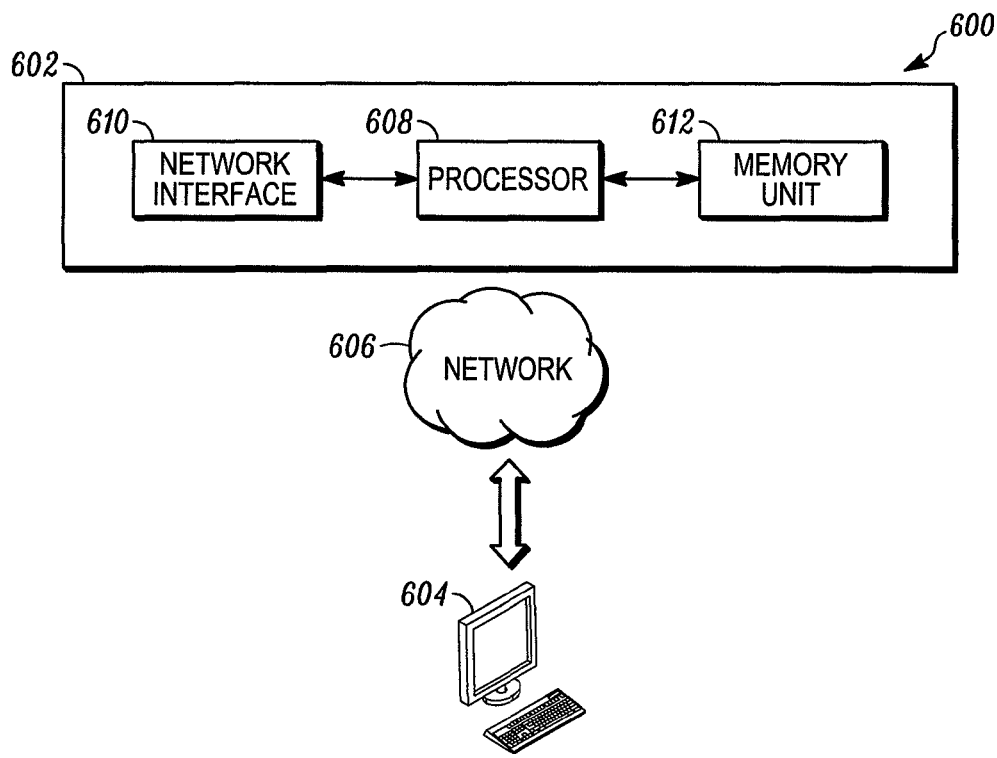
FIG. 6 is a block diagram of one embodiment of a system for providing advertisement campaign information about an advertisement campaign to an advertiser.
Figure 7:
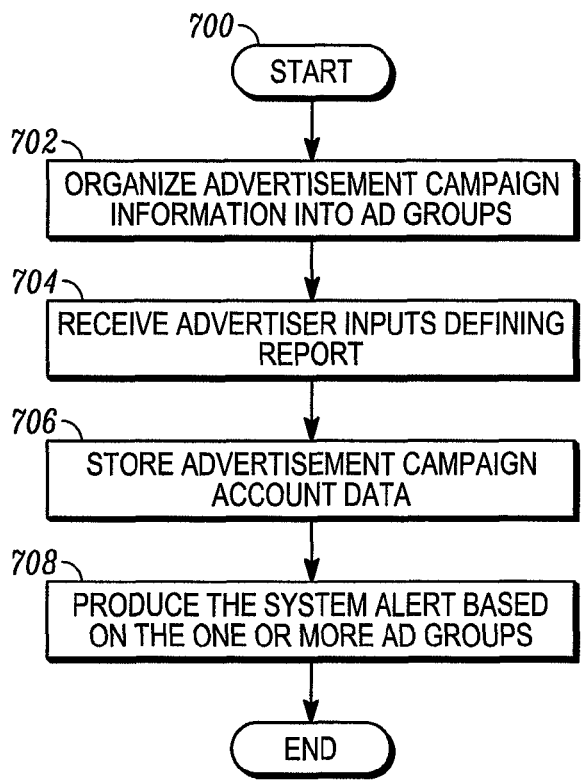
FIG. 7 is a flow diagram of one embodiment of a method for providing advertisement campaign information about an advertisement campaign to an advertiser.

The advertisement campaign management system as described with reference to FIGS. 1 and 2, the graphical user interfaces as described with reference to FIGS. 3-5, and the systems and methods as described with reference to FIGS. 6-7 provide access to an advertisement campaign management system that provides users and machines the ability to flexibly, dynamically, and efficiently manage large groups of advertisements. As opposed to interfaces to advertisement campaign management systems that only provide the ability to manage advertisement campaign information at a user account level or an individual advertisement level, the disclosed advertisement campaign management system provides the ability to manage advertisement campaign information at a level defined by the user. Users are given the ability to define their own groups of advertisement campaign information (an ad group) for advertisements that will be handled by the advertisement campaign management system in a similar manner. For example, users may group advertisements by a search tactic, performance parameter, demographic of a user, family of products, or almost any other parameter desired by the user. Allowing users to define their own ad groups allows the advertisement campaign management system to provide more useful information to the user thereby allowing the user to display, manage, optimize, or view reports on, advertisement campaign information in a manner most relevant to an individual advertiser.

Figure 1:
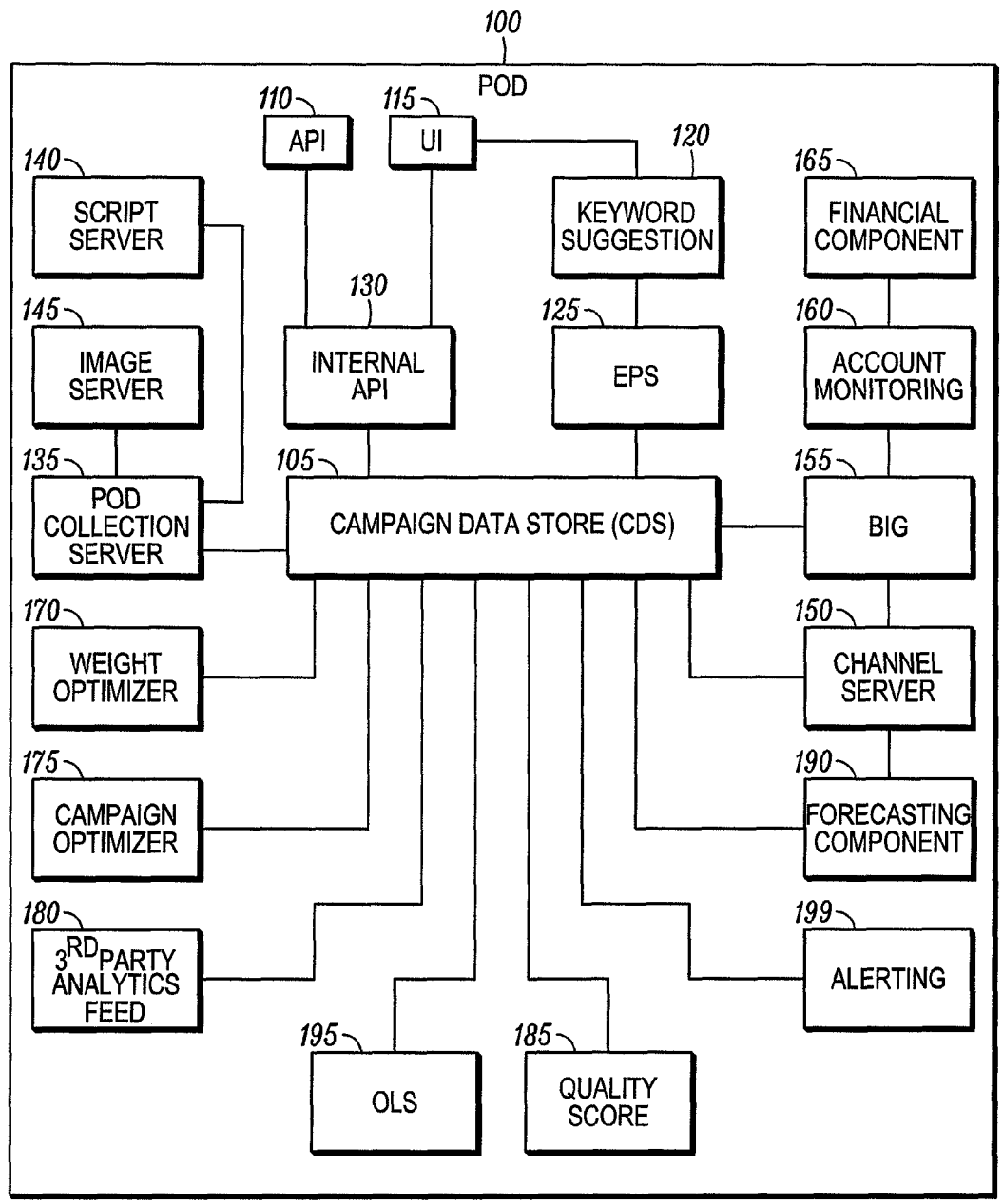
FIG. 1 illustrates one embodiment of a pod of an advertisement campaign management system.

FIG. 1 illustrates one embodiment of a pod of an advertisement ("ad") campaign management system. For additional information on the advertisement campaign management system, reference is made to U.S. patent application Ser. No. 11/324,129, filed Dec. 30, 2005 and entitled SYSTEM AND METHOD FOR ADVERTISEMENT MANAGEMENT, which application is incorporated herein in its entirety by this reference. Pod 100 comprises a plurality of software components and data for facilitating the planning, management, optimization, delivery, communication, and implementation of advertisements and ad campaigns, as well as for storing and managing user accounts. In one embodiment, a pod 100 comprises a campaign data store ("CDS") 105 that stores user account information. Application Program Interfaces ("APIs") 110 and User Interfaces ("UI") 115 are used for reading data from and writing data to the campaign data store 105. Internal APIs 130 provide shared code and functions between the API and UI, as well as facilitate interface with the campaign data store 105. A keyword suggestion component 120 may assist users in searching for available search terms. An editorial processing system ("EPS") 125 may be provided to review content of all new ads. A pod collection server ("PCS") 135 determines which pod the collected ad campaign performance data should go to. A script server 140 provides scripts for collection of data indicative of the customer browsing sessions. An image server 145 receives and processes data indicative of the customer browsing sessions from the customer web browsers.

The pod may further comprise a channel server 150 operative to receive data from one or more advertising channels. A business information group ("BIG") 155 may provide analysis and filtering of raw click data coming from the advertising channels through the channel server 150. An account monitoring component 160 monitors budgets allocated for each ad campaign. A financial component 165 may be provided for planning and budgeting ad campaign expenses. A weight optimizer 170 operative to optimize individual ad performance. A campaign optimizer 175 may be provided to optimize performance of the ad campaign. A third-party analytical feed component 180 is provided to handle the incoming ad performance data from the third-party sources. A quality score component 185 provides yet another metric for measuring individual ad performance. A forecast component 190 is an analytical tool for predicting keywords trends. Finally, an online sign-up ("OLS") component 195 provides heightened security services for online transactions involving exchange of moneys.

The CDS 105 is the main data store of pod 100. In one embodiment, CDS 105 stores ad campaign account data, including account access and permission lists, user information, advertisements, data collected from advertiser websites indicative of customer browsing sessions, raw click data received from the advertising channels, third party analytical feeds, ad campaign performance data generated by the system, ad campaign optimization data, including budgets and business rules, etc. In various embodiments of the invention, CDS 105 stores one or more account data structures as illustrated in FIG. 2 and described in greater detail below.

Data in the CDS 105 may be stored and accessed according to various formats, such as a relational format or flat-file format. CDS 105 can be managed using various known database management techniques, such as, for example, SQL-based and Object-based. At the physical level, the CDS 105 is implemented using combinations of one or more of magnetic, optical or tape drives. Furthermore, in one embodiment of the invention, CDS 105 has one or more back up databases that can be used to serve Pod 100 during downtime of CDS 105.

In one embodiment, a pod 100 exposes one or more APIs 110 and UIs 115 which are utilized by the system users, such as advertisers and agencies, to access services of the ad campaign management system, such as for reading data from and writing data to the campaign data store 105. The advertisers and their agencies may use the APIs 110, which in one embodiment includes XML-based APIs, to allow access to the ad campaign management system and data contained therein. In one embodiment, the UI 115 comprises a website or web application(s) for enabling user access to the ad campaign management system. The pod 100 utilizes internal APIs 130, which are shared code and functions between the APIs 110 and UI 115, to facilitate interaction with campaign data store 105.

According to some embodiments, the above-described user and application program interfaces are used to facilitate management and optimization of ad campaigns, which include, but are not limited to, management of listings associated with an auction-based search-term related sponsored search results listings marketplace. For example, advertisers use these interfaces to access ad campaign information and ad campaign performance information saved in the ad campaign data store 105, search the information, analyze the information, obtain reports, summaries, etc. Advertisers may also change listings or bidding strategies using these interfaces, which changes are updated in the campaign data store 105. Furthermore, these interfaces may be used to perform comparisons of the performance of components of ad campaigns, such as performance of particular listings, search terms, creatives, channels, tactics, etc.

While functionality and use of application program interfaces of the pod is described with reference to an auction-based search term-related sponsored listings context, it is to be understood that, in some embodiments, these interfaces may be used with regard to off-line or non-sponsored search ad campaigns and ad campaign performance, or combinations of on-line and off-line ad campaigns information, as well.

A keyword suggestion component 120 provides for keyword suggestion through interfaces 110, 115 for assisting users with ad campaign management based on seed terms or a universal resource locator ("URL") provided by a user. In one embodiment of the invention, the keyword suggestion component 120 assists users to search for available search terms. As described above, in an auction-based system or marketplace, advertisers bid for search terms or groups of terms, which, when used in a search by customers, will cause display advertisement listings or links among the search results. The keyword suggestion component 120 provides suggestions to advertisers regarding terms they should be bidding. In one embodiment, the keyword suggestion component 120 may look at actual searches conducted in the last month and provide a suggestion based upon previous searches. In another embodiment, the keyword suggestion component 120 may look at the terms other advertisers of similar products or services are bidding on and suggest these terms to the advertiser. In yet another embodiment, the keyword suggestion component 120 may determine terms that customers who bought similar products or services use in their searches and suggest these terms to the advertiser. In another embodiment, the keyword suggestion component 120 may maintain a table of terms divided into several categories of products and services and allow an advertiser to browse through and to pick the available terms. In other embodiments, the keyword suggestion component 120 may use other techniques for assisting advertisers in the term selection process, such as suggesting a new term to the advertiser if the advertised products and services are unique.

The editorial processing system (EPS) 125 ensures relevance and mitigates risks of advertisers' listings before a listing can participate in the auction. In general, the EPS 125 reviews new or revised ads. In one embodiment, the EPS 125 applies a set of business rules that determines accuracy and relevance of the advertiser listings. These rules may be applied automatically by the EPS 125 or through a human editorial review. The EPS 125 may, for example, detect inappropriate content in the advertiser listings or illegally used trademark terms. In one, EPS 125 responds with an annotation such as rejected, approved, rejected but suggested changes, etc.

In one embodiment, EPS 125 may comprise a quick check component. The quick check component performs a preliminary or a "quick check" to determine whether to accept or reject an ad automatically before it is submitted to a human editor and stored in the campaign data store 105. In one embodiment, either API 110 or a UI 115 invokes the quick check component service so that advertiser can receive instant feedback. For example, use of prohibited words, such as "best" in the submitted advertisement, may be quickly detected by the quick check component and, obviating the need for human editorial review. In contrast, using words such as gambling, adult services, etc., the quick check component might determine that the ad requires a more thorough editorial review. One of the benefits of the quick check component is the rapid provision of feedback to the advertiser, which enables the advertiser to revise the listing right away and thus to expedite review by the human editor.

Again with reference to FIG. 1, according to one embodiment, the pod 100 may further comprise a channel server 150, which is operable to receive and process data received from an advertising channel, such as Google.com and MSN.com. This data may include but is not limited to the customer profiles, historical user behavior information, raw impressions, cost, clicks, etc. Additional description of user information and its uses can be found in U.S. patent application Ser. Nos. 60/546,699 and 10/783,383, the entirety of which are both hereby incorporated by reference. The channel server 150 may further be operable to re-format the received data into a format supported by the ad campaign management system and to store the reformatted data into the campaign data store 105.

In one embodiment, pod 100 may further comprise a business information group (BIG) component 155. BIG 155 is operable to receive cost, click, and impression data that is coming into the pod 100 from various sources including the channel server 150, pod collection server 135 and third-party analytics feeds component 180. BIG 155 assures that this data is received in a correct and timely manner. In one embodiment, BIG 155 may also perform aggregation and filtering on raw data impressions and clicks that are coming into the pod 100. BIG 155 may be further operable to store the collected and processed data into the Campaign Data Store 105. In other embodiments, BIG 155 may also perform internal reporting, such as preparing business reports and financial projections according to teaching known to those of skill in the art. To that end, in one embodiment, BIG 155 is operable to communicate with the Account Monitoring component 160, which will be described in more detail next.

In one embodiment, the pod 100 may further comprise an account monitoring component 160. This component 160 may be operable to perform budgeting and campaign asset allocation. For example, the account monitoring component 160 may determine how much money is left in a given advertiser's account and how much can be spent on a particular ad campaign. In one embodiment, the account monitoring component 160 may employ a budgeting functionality to provide efficient campaign asset allocation. For example, an advertiser may set an ad campaign budget for a month to $500. The account monitoring component 160 may implement an ad bidding scheme that gets actual spending for that month as close to $500 as possible. One example of a bidding scheme employed by the account monitoring component 160 would be to lower the advertiser's bids to reduce how often the advertiser's ads are displayed, thereby decreasing how much the advertiser spends per month, which may be performed dynamically. Another example of budgeting by the account monitoring component 160 is to throttle the rate at which advertisements are being served (e.g., a fraction of the time it is served) without changing the advertiser's bid (whereas in the previous example the bid was changed, not the rate at which advertisements were served). Another example of throttling is to not serve an ad as often as possible but put it out according to a rotation.

In one embodiment, the pod 100 may further comprise a financial component 165, which may be an accounting application for planning and budgeting ad campaign expenses. Using the financial component 165 advertisers may specify budgets and allocate campaign assets. The financial component 165 provides an advertiser with the ability to change distribution of campaign budget and to move money between different campaigns. The financial component 165 may also present advertisers with information on how much money is left in the account and how much can be spent on a particular ad campaign. In some embodiments, the financial component 165 may further be operable to provide advertisers with information regarding profitability, revenue, and expenses of their ad campaigns. The financial component 165 may, for example, be implemented using one or more financial suites from Oracle Corporation, SAP AG, Peoplesoft Inc., or any other financial software developer.

In one embodiment, pod 100 may further comprise an online sign-up (OLS) component 195. The OLS component 195 may be operable to provide advertisers with a secure online sign-up environment, in which secure information, such as credit card information, can be exchanged. The secure connection between the advertiser computer and the OLS component 195 may be established, for example, using Secure Hypertext Transfer Protocol ("SHTTP"), Secure Sockets Layer ("SSL") or any other public-key cryptographic techniques.

In one embodiment, the pod 100 may further comprise a quality score component 185 that calculates one or more values such as an ad clickability score and a quality score. An ad clickability score is one of the ad performance parameters whose value represents a quality of an ad at the time the advertisement service provider serves the ad. The ad clickability score is internal to the ad campaign management system and is typically not exposed external to the ad campaign management system. A quality score is one of the ad performance parameters that is exposed externally from that ad campaign management system and may be used by the search serving components, such as advertising channels and search engines, to qualify the relative quality of the displayed ads. Thus the quality score is calculated by the search serving components and fed into the ad campaign management system through the quality score component 185 in accordance with one embodiment of the present invention. In some embodiments, the quality score is displayed to the advertiser, so that the advertiser may revise the ad to improve its quality score. For example, if an ad has a high quality score, then the advertiser knows not to try to spend money and time trying to perfect the ad. However, if an ad has a low quality score, it may be revised to improve ad's quality score.

In one embodiment, the pod 100 further comprises a forecasting component 190, which is an analytical tool for assisting the advertiser with keyword selection. In some embodiments, the forecasting component is operable to predict keywords trends, forecast volume of visitor traffic based on the ad's position, as well as estimating bid value for certain ad positions.

In one embodiment, the forecasting component 190 is operable to analyze past performance and to discover search term trends in the historical data. For example, the term "iPod" did not even exist several years ago, while now it is a very common term. In another embodiment, the forecasting component 190 performs macro-trending, which may include forecasting to determine terms that are popular in a particular region, for example, California, or with particular demographic, such as males. In yet another embodiment, the forecasting component 190 provides event-related macro- and micro-trending. Such events may include, for example, Mother's Day, Christmas, etc. To perform event-related trending for terms related to, for example, Mother's Day or Christmas, the forecasting component 190 looks at search patterns on flower-related terms or wrapping paper terms. In other embodiments, the forecasting component 190 analyzes the historic data to predict the number of impressions or clicks that may be expected for an ad having a particular rank. In another embodiment, the forecasting component 190 is operable to predict a bid value necessary to place the ad in a particular position.

In one embodiment, the pod 100 further comprises a weight optimizer 170, which may adjust the weights (relative display frequency) for rotating elements as part of alternative ad ("A/B") functionality that may be provided by the ad campaign management system in some embodiments of the present invention. The A/B testing feature allows an advertiser to specify multiple variants of an attribute of an ad. These elements may include creative (title, description and display URL), destination (landing URL) and perhaps other elements such as promotions and display prices. More specifically, when an end-user performs a search, the ad campaign management system assembles one of the possible variants of the relevant ad and provides it to the advertising channel for display to the end-user. The ad campaign management system may also attach tracking codes associated with the ad, indicating which variant of each attribute of the ad was actually served. The behavior of the end-user then may be observed and the tracking codes may be used to provide feedback on the performance of each variant of each attribute of the ad.

In determining the weight for a particular element, the weight optimizer component 170 may look at actual performance of ads to determine optimal ads for delivery. The weight optimizer component 170 operates in multiple modes. For example, in Optimize mode the weight (frequency of display) of each variant is changed over time, based on the measured outcomes associated with each variant. Thus, the weight optimizer component 170 is responsible for changing the weights based on the measured outcomes. The weight optimizer component may also operate according to Static mode, in which the weights (frequency of display) of each variant are not changed by the system. This mode may provide data pertaining to measured outcomes to the advertiser. The advertiser may have the option to manually change the weights.

The pod 100 may further comprise a campaign optimizer component 175, which facilitates ad campaign optimization to meet specific ad campaign strategies, such as increasing number of conversions from displayed ads while minimizing the cost of the campaign. To that end, in some embodiments, campaign optimizer component 175 uses data received from the channel server 150, forecasting component 190, third party analytics feed component 190, quality score component 185, and BIG 155 to determine how much to bid on which ads, how to allocate the budget across different ads, how to spend money over the entire period of the campaign, etc. Furthermore, campaign optimization not only focuses on executing ads efficiently, but also performing arbitrage between ads across various channels and tactics to determine where the limited ad campaign budget is most effective.

In one embodiment, the campaign optimizer component 175 analyzes the obtained analytics data, including ad campaign information, ad campaign performance information, as well as potentially other information, such as user information, to facilitate determining, or to determine, an optimal ad campaign strategy. Herein, an "optimal" ad campaign strategy includes any ad campaign strategy that is determined to be optimal or superior to other strategies, determined to be likely to be optimal, forecasted or anticipated to be optimal or likely to be optimal, etc. In some embodiments, optimizing is performed with respect to parameters, or a combination of parameters, specified by an advertiser, supplied automatically or partially automatically by the ad campaigns facilitation program, or in other ways.

In addition to the foregoing, ad campaign strategy may include any course of action (including, for example, changing or not changing current settings or strategy) or conduct, or aspects or components thereof, relating to an ad campaign. An ad campaign strategy may include a recommendation regarding a course of action regarding one or more aspects or parameters of an ad campaign, and may include an immediate course of action or set of parameters, or a course of action or set of parameters for a specified window of time. For example, an optimal ad campaign strategy in the context of an auction-based search result listings situation, may include recommendations relating to bidding and bid hiding rates in connection with an auction or marketplace relating to search term or group of terms in connection with sponsored listings.

In some embodiments, the campaign optimizer component 175 may be operable to analyze ad campaign performance information to determine an optimal ad campaign strategy. Ad campaign performance information may include a variety of information pertaining to historical performance of an ad campaign, channel, tactic, or ad or group of ads. Ad campaign performance information can include many types of information indicating or providing a suggestion of how effectively ads, or ads presented though a particular channel, etc., influence or are likely to influence user or consumer behavior. For example, an advertising channel such as Yahoo! may collect performance information with respect to a particular sponsored search result listing. The information may include a number or percentage of viewers who clicked on the link, or who shopped at or purchased a product at the advertisers Web site as a result of the listing, etc.

The campaign optimizer component 175 may be operable to analyze ad campaign information to determine an optimal ad campaign strategy. Ad campaign information may include campaign objectives or budget-related conditions or constraints, or can include information specifying, defining, or describing ads themselves, channels, tactics, etc. With regard to auction-based sponsored search result listings, ad campaign information can include bidding parameters such as maximum or minimum bids or bidding positions (rankings or prominence of listings) associated with a term or term cluster, for instance, as further described below. Such ad campaign information can also include campaign objectives, quotas or goals expressed, for example in metrics such as ROAS (return on ad spend), CPI (clicks per impression), or in other metrics, and with respect to individual ads, terms or term groups, channels, tactics, etc.

The campaign optimizer component 175 may further include bid optimization functionality, which may be used by the system to determine a desirable or optimal bid for a listing, such as a paid search result. The bid optimization functionality of the campaign optimizer component 175 may be used to constrain the set targets and constraints on the bids set by an advertiser. The constraints may include a maximum bid and a minimum bid. The targets may be associated with the listing and can be specified in terms of one or more metrics related to the performance of the listing. The campaign optimizer component 175 may analyze recent past analytics in connection with the metric and specify a bid recommendation forecasted by the bid optimizer functionality to achieve the target or get as close to the target as possible. In some embodiments, the campaign optimizer component 175 can also provide a recommendation for a listing, which may include a maximum bid and an update period, which update period can be a time between maximum bid hiding updates. In other embodiments, the campaign optimizer component 175 can also provide a recommendation including a range of values that should allow the listing to obtain a premium position when served, such as a first page listing.

To facilitate ad campaign management and optimization, the pod 100 is further operable to collect visitor state data from the advertiser websites in accordance with a preferred embodiment of the ad campaign management system. To that end, the pod 100 utilized pod collection server 135, script server 140, and image server 145 to collect visitor state data and to store the same in the campaign data store 105. The collected visitor state data may then be used by various components of the pod 100 including, but not limited to, campaign optimizer component 175, forecasting component 190, and BIG 155 to generate ad campaign performance data in accordance with various embodiments of the present disclosure.

The various methods of data collection in accordance with various embodiments of the present invention may include, but are not limited to, full analytic, campaign only, conversion counter and sampling. In one embodiment, full analytics collection provides the most robust collection method. The full analytics collection collects marketing-based and free search-based leads. As a result, the advertiser may see a complete picture of how leads and conversions are generated. Primarily, the full analytics collection method provides a full funnel report that will provide a key view into how visitors of the advertiser website go from being a lead through to browser, prospect, and finally a paying customer. Visitor state storage on Campaign Data Store 105 may also allow for repeat and return customer report data and for a full suite of accreditation methods.

In another embodiment, a campaign only analytics collection method is much like full analytic but only paid marketing events are tracked and result events generated from free search are ignored or discarded. This has the advantage of providing funnel and repeating visitor reports as well as a reduced data collection and storage rate. The campaign only analytics method provides a balance of rich report data and reduced collection, processing, and storage cost.

In yet another embodiment, the conversion counter method is the most simple analytics data collection available. With conversion counter analytics, the advertiser places a tag on pages where value is generated for the advertiser, such as revenue. The image server 145 places the lead "stack" in a cookie, which may be used to accredit the proper term/creative to the conversion event. This data collection mechanism generates enough data to provide optimization on creative weighting. It should be further noted that in one embodiment a direct accreditation method may be applied to the conversion counter method. In the conversion counter approach, no visitor state storage is needed and only conversion events are received. Thus, this approach has a minimal effect on pod 100 load and data storage requirements. In another embodiment, a sampling method is utilized. In accordance with this method, only a random number of unique visitors, for example, 10%, are tracked, which reduces data collection and storage.

In order to allow for accreditation of the lead generation source to a conversion event, the state of the customer session on the advertiser's website may be maintained. Accreditation is the process by which all the marketing events are tied to a specific, or set of specific, marketing activities. There are two known approaches that may be utilized for storage of visitor state: client-side cookies and server-side database.

In one embodiment, cookies may be used as an exemplary client-side visitor state storage. When cookies are used to store visitor state one of two methods may be used to store visitor state. A redirection server used on the lead generating event may add the visitor state to the cookie at the click event. Alternatively a collection server may set the cookie at the time of a lead event. While visitor state in the cookie approach is the most cost effective it has several disadvantages. Generally, cookies have low storage requirements and thus an active search user (typically, most valuable users because they generate the most revenue) could lose accreditation information as their lead stack grows and causes some older events to be pushed out. As a result, a conversion event could occur where the lead information was lost in the stack and thus the accreditation is lost. Furthermore, cookie-off users are essentially invisible to the system. Moreover, efficacy is reduced due to the additional time needed to parse the collection server request when the cookie is set, which may cause end users to click away from the lead page before the cookie can be completed. Finally, cookie based visitor state storage prevents any internal analysis of user behavior.

In another embodiment, server-side database, such as the CDS 105, may be used to store visitor state. Using server side storage in a database offers the high efficacy rates but at the additional cost of the storage. Using server side storage of visitor state allows the ad campaign management system to have more advanced accreditation models, which could allow for assist-based accreditation. Efficacy rates over cookie based visitor state storage are increased due to many factors. Primarily the system is no longer limited in the amount of visitor state storage a single user can have so no lead loss would occur. Cookies off users can still be traced as unique visitors so they can still be tracked (although at a reduced rate of accuracy) and thus are able to be included. Collection event processing latency is greatly reduced because the event can be just logged and then actually processed later. With the cookie approach lead accreditation has to occur at the time the event is received because the cookie must be evaluated before the request is returned by the beacon servers. Furthermore, with visitor state stored in the campaign data store, valuable marketing data can be collected and analyzed for internal use.

In one embodiment, the ad campaign management system utilizes a combination of the above-described client-side cookies and server-side database techniques to collect and maintain visitor state data. In particular, as indicated above the pod 100 utilizes pod collection server 135, script server 140, and image server 145 to collect visitor state data and to store the same in the campaign data store 105. In one embodiment, the pod collection server 135, script server 140 and image server 145 may be implemented, for example, as Java servlets.

Alerting system 199 provides applications, utilities and data for providing alerts to an advertiser. The alerting system 199 operates to provide information to the advertiser about the status of the advertiser's accounts, campaigns, ad groups and other items. Alerts are separated into several categories, as will be described in greater detail below.

The alerting system 199 interacts with other components of the pod 100 to interactively determine the status of a condition on which an alert has been placed, obtain the necessary data from the campaign data store or another source 105, and provide the alert to an advertiser. As will be described in greater detail below, the advertiser interacts with a user interface to define the alerts to be produced. These inputs define, for example, the trigger condition required to activate the alert and the action to be taken, such as sending an email message to the advertiser. The alerting system 199 obtains the necessary data and prepares the alert in the specified format and at the specified time, such as in a daily summary or an instantly generated alert message. A large number of pre-defined alerting formats are available to address the needs of an advertiser to monitor his ads. This large number of alerts may be further customized by the advertiser interacting with the user interface to specify particular alerts or formats.

Figure 2:
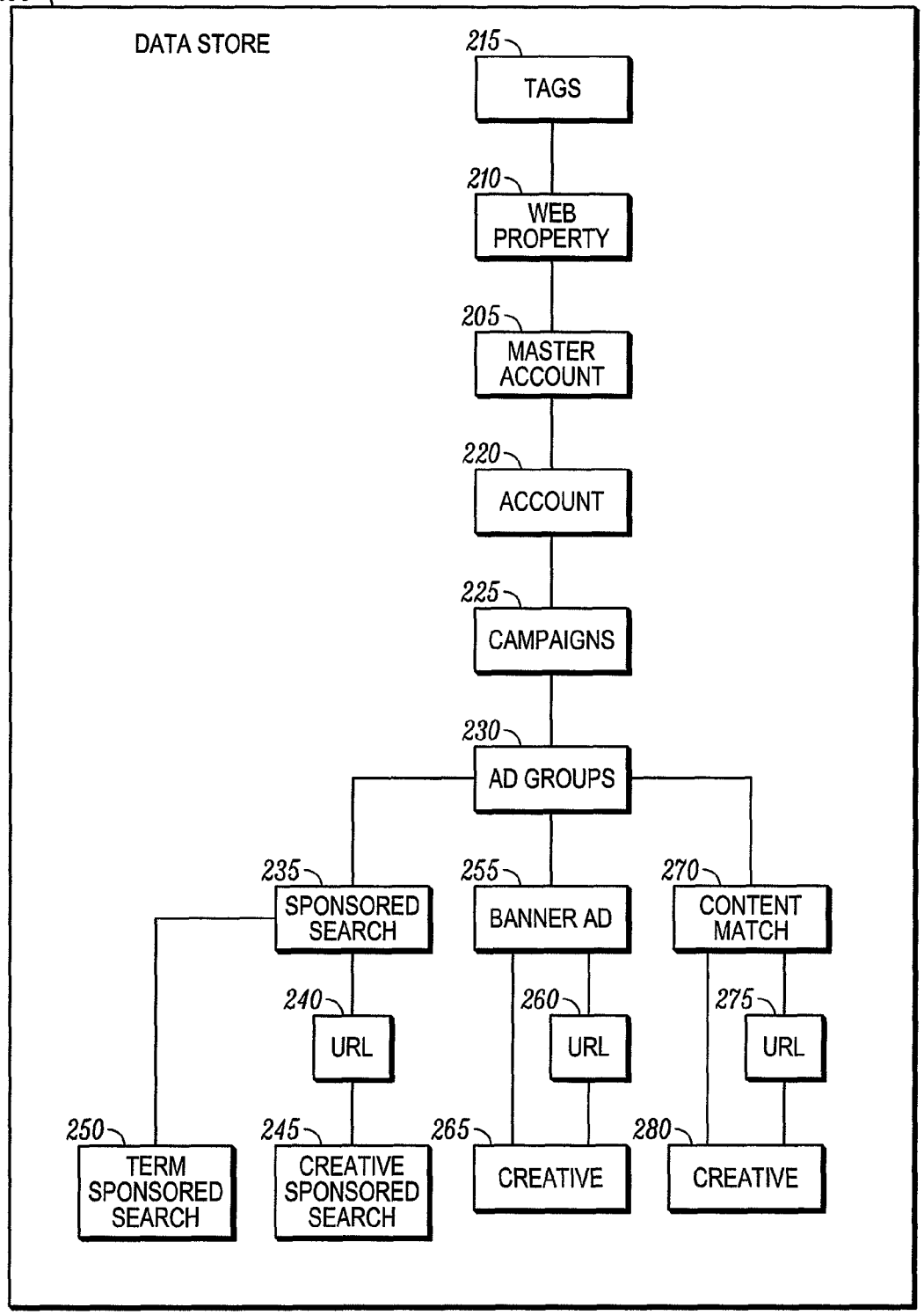
FIG. 2 is a block diagram of one embodiment of a model for the maintenance of advertisement campaign information according to the ad campaign management system of FIG. 1.

FIG. 2 is a diagram of one embodiment of a model for the maintenance of ads according to the ad campaign management system of FIG. 1. As depicted, an ad campaign management system comprises a data store 200 that facilitates hierarchical storage of ad campaign data, providing advertisers with multiple levels of structure for control of advertisement content. In particular, an advertiser utilizing services of the ad campaign management system may be provided with a master account 205 for receiving aggregated analytics relating to the master account 205 and managing or optimizing Web properties 210 and advertisements within the master account 205 based on the aggregated analytics. A Web property 210 may include a website, or a combination of related websites and pages for which the advertiser is advertising. Furthermore, within master account 205, an advertiser may create several accounts 220 to separately manage ad campaigns, as well as to collect ad performance information.

To facilitate tracking and collection of ad performance data from Web properties 210, data store 200 further maintains custom tags, program code, navigation code, etc. 215. According to one embodiment, a tag 215 may comprise a piece of code that is created by the system and placed on relevant Web pages of a given website to allow automatic tracking and collection of data indicative of customer session on the advertiser website. For example, a tag may be used to track user visits, interaction, or purchases from a website to which a user navigates as a result of clicking on an advertisement link associated with the website. Depending on specific needs and business objective of a given advertiser, tags may be coded to collect specific information about the customer session that is of interest to the advertiser. Thus, some tags may enable collection of data on numbers of raw clicks on the advertiser website, while others tags may track numbers of clicks that resulted in conversions, e.g., purchase of a product or service from the advertiser website. Those of skill in the art will recognize that data collection may be limited to other portions of the customer session.

Some embodiments utilize, or may be combined with, features or technologies, such as, for example, HTML tagging, data tracking, and related technologies, as described in U.S. patent application Ser. Nos. 09/832,434 and 09/587,236, the entirety of which are both hereby incorporated herein by reference.

In one embodiment, within a master account 205, an advertiser may maintain one or more accounts 220, which may be used to receive analytics related to a specific account 220 and manage ad campaign spending associated with individual Web properties 210. Thus, accounts 220 allow advertisers to distribute their advertising funding between different Web properties 210 and between separate ad campaigns 225. A given ad campaign 225 may include a set of one or more advertising activities or conduct directed to accomplishing a common advertising goal, such as the marketing or sales of a particular product, service, or content, or group of products, services or content. Two ad campaigns may be considered disparate when the ad campaigns are directed to different advertising goals. For example, an advertiser may wish to advertise a product for sale and a service associated with this product. Thus, the advertiser may store separate ad campaigns 225 for advertising the product and the service.

In one embodiment, storage of an ad campaign 225 may be further subdivided into several ad groups 230. An ad Group 230 may be thought of as a conceptual compartment or container that includes ads and ad parameters for ads that are going to be handled in a similar manner. An ad group 230 may allow for micro-targeting, e.g., grouping ads targeted to a given audience, a demographic group, or a family of products. For example, an ad group may be related to a given manufacturer's products, such as Sony, Microsoft, etc. or a family of high-end electronics, such as TVs, DVDs, etc. There is a number of ways in which a given group of ads may be managed in a similar manner. For example, an advertiser may specify that there be a certain markup (e.g., 50%) on items in a given ad group, may want to distribute all those ads in a certain way, or may want to spend a certain amount of its budget on those advertisements. Further, an ad group 230 provides a convenient tool for an advertiser to move a large group of ads and ad parameters from one ad campaign 225 to another ad campaign 225, or to clone a large group of ads and ad parameters from one ad campaign 225 to another ad campaign 225.

In one embodiment, changes made to the parameters of a given ad group 230 may apply to all ads within the given ad group. For example, one such parameter may be pricing. For a sponsored search, an advertiser may set the default price for the whole ad group but may override the price on each individual term. Similarly, an advertiser may further specify that certain terms are low value, but decide to increase the amount spent on another term uniformly across all ads in a given ad group. Thus, storage according to one or more ad groups 230 enables advertisers to bridge the gap between ad campaigns and the individual ads comprising a given ad campaign.

A given ad may contain one or more items of advertising content that are used to create ads/terms in an ad group, including, but not limited to, creatives (e.g., titles, descriptions) and destination URLs (plus associated URL tracking codes). Optionally, a given ad may contain a {KEYWORD} token for substitution of alternate text in the title, description, or other ad component. Furthermore, ads may exist as a template in an ad library (not pictured) that can be reused across ad groups or a local ad that is used and stored only within a specific ad group. The ad library, which may be provided by the ad campaign management system, allows advertisers to store ad templates, sharing and reusing them across campaigns and ad groups. Ads in the ad library may be shared within an account, e.g., each account has its own library.

An ad group 230 may utilize numerous tactics for achieving advertising goals. The term "tactic" includes a particular form or type of advertising. For example, in on-line advertising, tactics may include sponsored search result listings 235, banner advertisements 255, content match 270, etc. In off-line advertising, tactics may include television commercials, radio commercials, newspaper advertisements, etc. In different embodiments, tactics may include subsets or supersets of the listed examples or other examples. For instance, on-line advertising is an example of a broader tactic than the narrower tactic of sponsored search result listings. Furthermore, the advertiser may utilize multiple advertising channels for different tactics. For example, the advertiser may utilize sponsored search listings in several websites or portals, such as Yahoo!, Google.com, MSN.com, etc. In one embodiment, a user may set parameters within the ad group 230 to place a spend limit for each type of advertising tactic comprising the ad group 230.

One example of an advertising tactic is sponsored search 235. According to one embodiment, sponsored search 235 operates as follows: an auction-based system or marketplace is used by advertisers to bid for search terms or groups of terms, which, when used in a search, causes the display of a given advertiser's ad listings or links among the display results. Advertisers may further bid for position or prominence of their listings in the search results. With regard to auction-based sponsored search 235, a given advertiser may provide a uniform resource locator (URL) 240 to the webpage to which the ad should take the customer if clicked on, as well as the text of the advertisement 245 that should be displayed. Advertiser may further identify one or more terms 250 that should be associated with the advertisement 245.

Another example of advertising tactic is content match 270. Storage of content match advertisements 280 may be used by the advertiser to complement, or as alternative to, the sponsored search tactic 235. Ads stored according to the content match tactic 270 are displayed alongside relevant articles, product reviews, etc, presented to the customers. For the content match tactic 270, data store 200 stores one or more URLs 275 identifying the address of a webpage where given ad should take the customer if clicked on, as well as the text, image, video or other type of multimedia comprising the creative portion of the advertisement 280.

Yet another example of an advertising tactic is banner ad 255. Banner ad tactic 255 may be used by the advertiser to complement, or as alternative to, the sponsored search tactic 235 and content match tactic 270. In contrast to the sponsored search tactic and content match tactic, which are usually based on a pay-per-click payment scheme, an advertiser pays for every display of the banner ad 265, referred to as an impression. Alternatively, if the banner ad displays a phone number, advertiser may only be billed when a user calls the phone number associated with the advertisement. Thus, for the banner ad tactic, the data store 200 maintains a URL 260 to the webpage where the ad should take the customer if clicked on, as well as the creative that comprises the banner ad 265.

The data store 200 of the ad campaign management system may further store various parameters for each ad group. Such parameters may include, for example, maximum or minimum bids or bidding positions (rankings or prominence of listings) associated with a term or term cluster for the particular ad group or ads within a given ad group. As described above, in embodiments of an auction-based sponsored search result listings environment, prominence or rank of listings is closely related to ad performance, and therefore a useful parameter in ad campaign management. The rank of a given ad determines the quality of the placement of the ad on pages that are displayed to customers. Although details vary by advertising channel, top-ranked listings typically appear at the top of a page, the next listings appear in the right rail and additional listings appear at the bottom of the page. Listings ranked below the top five or so will appear on subsequent search results pages.

There is a correlation between rank and both number of impressions and click-through rate (clicks per impression), which provides an opportunity for advertisers to pay more per click (get a higher rank) in order to get more visitors to their web site. The result is that an advertiser may determine, how much the advertiser should be willing to bid for each listing based on the advertiser's business objectives and the quality of the traffic on their web site that is generated by the listing. This information may also be stored for a given ad group 230 in the data store 200 of the ad campaign management system of the present invention.

Figure 4:
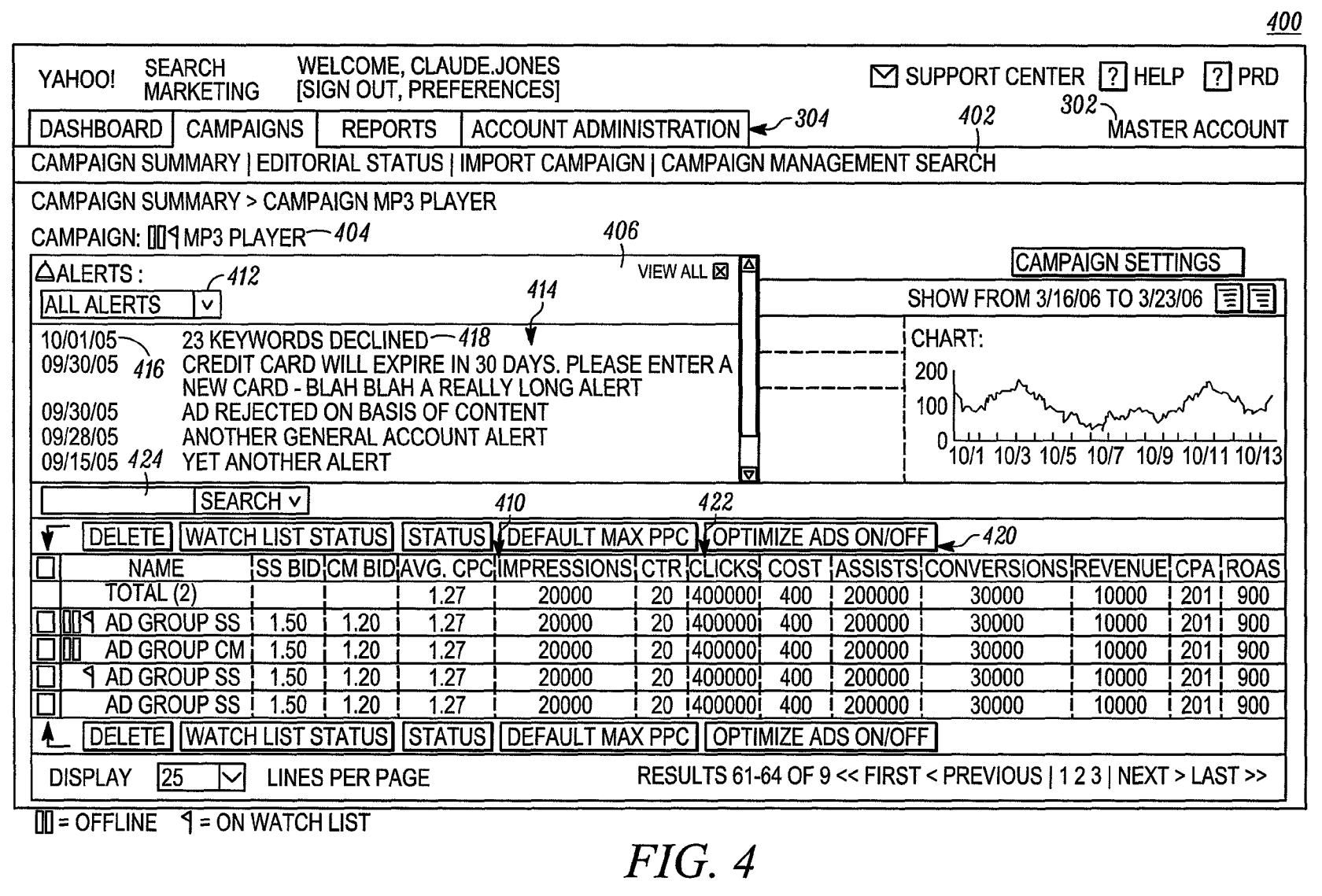

FIGS. 3-5 are examples of different embodiments of graphical user interfaces ("GUIs") 115 to the campaign management system of FIG. 1 that provide a user the ability to display, manage, optimize, or view and customize system alerts about the user's advertisement campaign information. FIG. 3 will first be described as being illustrative of available system alerts in general. Then, more detail about the particular alert implementation will be provided.

FIG. 3 is an example of one embodiment of a GUI 300 displaying advertisement campaign information. The GUI 300 presents a dashboard or condensed, summary view of an advertiser's account. The GUI 300 includes a master account selector 302, a view selector 304, an account selector 306, an alerts area 308, a graphical performance summary area 310 and a tabular performance summary area 312. In other embodiments, other textual or graphical components may be provided or the relative sizes and shapes of the components of the GUI 300 may be changed to fulfill a particular design need.

The Master Account selector in the embodiment of FIG. 3 is a drop down menu. Upon actuation of the drop down menu, one or more master account identifiers are displayed for selection by the user. The master account identifiers may be tied to login information provided by the user at the time the GUI 300 is accessed.

The view selector 304 includes multiple tabs for selecting different views. In the illustration of FIG. 3, the dashboard view is selected and displayed. Other available views include a Campaigns view, a Reports view and an Account Administration view. Each respective view may be actuated or selected by clicking the respective tab, which forms a hyperlink to redirect the user's browser to the selected view.

The account selector 306 allows the user to select an account among several accounts that the user may have within the master account. The master account (XYZ Electronics in the illustrative example of FIG. 3) is identified next to the account selector 306. The account selector is a drop down menu that allows an individual account to be selected and information connected with that account to be displayed.

The alerts area 308 displays information about alerts set by the user. The alerts area 308 includes an alert selector 314 and an alert list 316. The alert selector 314 operates as a filter allowing the user to select which alerts are displayed. The alert list 316 includes all alerts among the group selected by the alert selector 314. Each alert in the alert list 316 includes a date 318 and alert identification information 320. In other embodiments, other information may be provided as well or instead.

The graphical performance summary area 310 includes a graph 322 summarizing performance of the account selected by the account selector 306. The graph shows daily performance of displayed parameter. In the illustrative example of FIG. 3, the displayed parameter is impressions. Other examples may include clicks, click through rate, actions, etc. The number of the selected parameter is arranged on the ordinate of the graph and the date information is arranged on the abscissa. The graphical performance summary area 310 also displays a table 324 of summary information for possible display parameters.

The tabular performance summary area 312 provides a table of performance information for quick review by the user. The graphical performance summary area 310 includes a parameter selector 326, a date selector 328 and a table 330. The parameter selector 326 is a drop down menu which allows the user to specify what parameter is to be tracked in the graphical performance summary area 310. The date selector 328 allows the user to specify starting and ending dates for which data should be displayed. The table 330 shows the data aggregated for the selected parameter during the specified date period.

On the Dashboard, alerts are displayed in the alerts area 308 in an alert summary panel listed by category (one selected or "All"), with high priority alerts listed first followed by alerts of normal priority, with each priority class sorted by date descending. The alert selector 314 dropdown updates the list below containing the three most recent alert detail items for that category, including the datetime of last update (or alternatively, calculated duration; e.g., "3 days ago").

When the View All link 332 in the alerts area 308 is clicked, the user's browser navigates to a View All Alerts page prefiltered for the alert category (selected in the alert selector 314 dropdown) and the selected Account(s). When an alert identification information 320 is clicked, the user' browser navigates to the appropriate page for the associated item.

Thus, the dashboard view illustrated in FIG. 3 provides the user with a quick summary of current account status. The controls of the dashboard may be actuated to change the information displayed.

FIG. 4 is a second example of one embodiment of a GUI 400 displaying advertisement campaign information. The GUI 400 presents a Campaign Details view of an advertiser's account information. The Campaign Details view includes a Master Account selector 302, a view selector 304, campaign view selector 402, a campaign selector 404, an alerts area 406, campaign details graph area 408 and a campaign details table area 410.

The Master Account selector 302 and the view selector 304 operate substantially the same as described above in conjunction with FIG. 3. These controls may be actuated to change the view and content of the GUI 400.

The campaign view selector 402 allows the user to select a particular campaign details page. Options include a campaign summary page, one example of which is illustrated in FIG. 4, an editorial status page, an import campaign page and a campaign management search page. Other pages may be provided as well to fit a particular application.

The campaign selector 404 allows the user to specify a campaign for which detailed information will be displayed. A campaign is a coordinated effort to advertise a product or service, with set goals, time duration, channels and tactics.

The alerts area 406 displays information about alerts set by the user. The alerts area 406 includes an alert selector 412 and an alert list 414. The alert selector 412 operates as a filter allowing the user to select which alerts are displayed. The alert list 414 includes all alerts among the group selected by the alert selector 412. Each alert in the alert list 414 includes a date 416 and alert identification information 418. In other embodiments, additional information may be provided as well.

The alerts panel in the alerts area 406 of the campaign details page displays alerts grouped by hierarchy level, rather than by alert category as in the Dashboard of FIG. 3. The alerts include those for the object itself, as well as its child levels. For example, the Campaign Details page of FIG. 4 includes alerts about the campaign, the campaign's ad groups and its ad groups' keywords and ads. The alerts listed include a combination of Editorial and Opportunity alerts (as described herein) for the object and its child elements.

The campaign details table area 410 allows display of data about the selected advertising campaign. The campaign details table area 410 includes controls 420, a table 422 and a search box 424. The controls 420 afford the user control over the information displayed in the campaign details table area 410. The table 422 includes rows for several entries, such as multiple ad groups as shown in FIG. 4, and columns of data for each entry. The search box allows the user's account to be searched for particular text entered in the box.

FIG. 5 is an alert notification settings page 500. The alert notification settings page 500 allows a user to set up and modify alert notifications about his account. The alert notification settings page 500 includes a Master Account selector 302, a view selector 304, a daily alert summary selector section 502 and an instant notification selector section 504.

The Master Account selector 302 and the view selector 304 operate substantially the same as described above in conjunction with FIG. 3 and FIG. 4. These controls may be actuated to change the view and content of the GUI 400.

The daily alert summary selector section 502 allows a user to activate a daily summary of alerts for the account. The daily alert summary selector section 502 includes a notification selector 506, an alert type selector 508, an email address selector 510 and a priority selector 512. The notification selector 506 is a binary on/off toggle selector. When the on designator is selected (e.g., by clicking with a mouse), the daily alert summary will be provided to the user. The alert type selector 508 includes a series of check boxes permitting the user to select which types of alerts will be provide in the daily summary. Possible alert types include account alerts, editorial alerts, reminders or notifications and opportunity alerts.

The email address selector 510 allows the user to select an email address to which the alerts will be automatically emailed. One option is the email address associated with the user in the user's account profile. Another option is an email address entered directly in a text box of the email address selector 510. Finally, the priority selector 512 allows the user to select the priority assigned to emails sent to the user with the daily alert summary. Options include high priority, normal priority and low priority.

The instant notification selector section 504 allows a user to obtain instant notification of alerts on his account, and to specify the alert to be received. It is to be noted that the alerting process is not "instant," as some processing and communication delay is inherent. However, in this constant, instant means that as soon as an alerting condition is detected, the alerting system proceeds to generate the alert and communicate it to the user, without further processing occurring.

The instant notification selector section 504 includes an instant notification selector 514, an alert selector 516, and email address selector 518 and an email priority selector 520. The instant notification selector 514 is a binary on/off toggle selector. When the on designator is selected (e.g., by clicking with a mouse), the instant alert notification will be provided to the user.

The alert selector 516 allows the user to select which alert will be provided. In the illustrated embodiment of FIG. 5, the alert selector 516 includes a set of check boxes associated with possible alerts. The user can select one or more alert check boxes to designate which alerts will be sent. In this example, the possible alerts include system alerts, account alerts and editorial alerts. The available system alerts include an alert when analytics tag data has not been received for an ad group or other listing. The available account alerts include an alert that the user's account has been take off line because the account balance or a threshold value has been exceeded, or simply a warning that the account balance is low. The editorial alerts available include an alert that the user's account has been taken off line due to editorial issues that need to be resolved before the account can be returned to service, an alert that an ad group is off line, and an alert that the system has rejected URL fan out. Any other alerts may be specified, depending on the nature of the account, the communications media available and the desires of the user. For example, additional communication media may be specified for sending an alert, such as by instant message (IM), by fax or telephone call, or otherwise.

The email address selector 518 allows the user to select an email address to which the alerts will be automatically sent. One option is to send email messages to the email address associated with the user in the user's account profile. Another option is an email address entered directly in a text box of the email address selector 518. The email priority selector 520 allows the user to select the priority assigned to emails sent to the user with the instant alert notification. Options include high priority, normal priority and low priority.

In general, system alerts are notification messages about conditions that are displayed throughout the application (e.g., on the Dashboard, FIG. 3, on the Campaign Details page FIG.

4, etc.). In some cases, alerts require action by the user, although others are simply informational. The alerting system may be implemented as one or more applications running on a processor such as a server having access to system information, such as the campaign data store 105, the user interface 115, the editorial processing system 125, the account monitoring component 160, the third party analytics feed 180, all as shown in the embodiment of FIG. 1. The applications which perform the functions described herein are generally called the alerting system 199 in FIG. 1.

The logic for triggering alerts can be either user-defined (i.e., users configure the thresholds or trigger conditions that cause the alert to be displayed) or built in to the application with embedded logic. Alerts are preferably generated based on statistically significant data. In other words, rather than generating an alert on a single event, several events are preferable aggregated as the basis for generating the alert.

Alerts can have suggested actions for the user to take either within or outside of the application. For example, if the account balance is low, the user might be able to add money in the application (via credit card) or outside (e.g., by sending a check).

In general, an alert is generated one time (i.e., as notification that an event occurred) and displayed until the user deletes the alert. The system does not check conditions dynamically to determine whether to display a given alert.

External operational systems such as the editorial processing system 125 and the account monitoring component 160 in FIG. 1, that generate alerts to be displayed in the advertiser application are accountable for managing time intervals between alerts and/or recurrence, so a Campaign Management Services application will just process each alert as it comes in, without regard to duplicates.

There are several categories of alerts in accordance with the present embodiments. These categories include system alerts, account alerts, editorial alerts, reminder alerts and opportunities alerts.

System alerts are displayed at the top of each page, below the main navigation controls, or associated with analytics data, rather than in the alert summary panel. There are several types of possible system alerts. The first is a System Status Message. This is a message posted by the operator of the online marketing system as notification about the status, availability, etc., of the application. Examples include that the application will be unavailable due to system upgrade or maintenance. A System Status Message is displayed at the top of each page (below the main navigation controls), rather than in the alert summary panel. The logic for displaying system status messages is based on the schedule set for the message using the account administration user interface. The system message will be displayed for the selected pods for the scheduled period, from the start datetime through the end datetime.

A second type of system alert is a Books Closed Warning message. This alert indicates to the user that the report/analytics data is incomplete for the (user-specified) period being viewed. This alert shows gaps for external data sources (e.g., cost data feed for external online search systems). This message is displayed inline with associated analytics data in reports, etc., rather than at the top of the page.

A third type of system alert is an Analytics Tag Data Not Received message. This is a high priority alert. This alert is displayed for accounts that have been tagged (e.g., with a conversion counter) but the online marketing system has not received tag data from the advertiser's website(s) in more than X hours, where X is, in one example, the average number of hours between conversions for the account*2. This alert is sent with daily frequency. In one example, the alert displayed may look similar to the following:

Analytics tag data from your website has stopped

Preferably, this alert text is hyperlinked to the following locations, depending on the logged-in user's role. For Administrators, the hyperlink is to an Account: Tag Settings page and the alert remains displayed at the top of the page. For non-administrators, the hyperlink is to a layer/page displaying a message instructing the user to contact an account administrator to log in and fix the problem.

Account alerts relate to the condition of the financial account maintained by the advertiser or user with the operator of the online marketing system. Sever account alerts are available.

The first account alert is an Account Offline—Balance Exceeded message. The trigger condition for this alert is a condition monitored by the Account Monitoring application 160 (FIG. 1). The condition monitored is "Payment Status—Off" for Pre-Pay, Fixed Budget and Non-Stop accounts. This alert is triggered when the account balance is exceeded. The associated logic is implemented within the Account Monitoring application 160. This alert may be provided with daily frequency. The alert displayed may look similar to the following:

Account {SUBACCOUNT_NAME} is offline - account balance exceeded

The alert text should be hyperlinked to one of the following locations, based on role. For Administrators, link to an Account: Add Money page and allow the user to enter an amount to add and choose a credit card to charge. For non-administrators link to a layer/page displaying a message instructing the user to contact an account administrator to fix the problem.

The second account alert is an Account Balance Low message. This is a high priority alert. The trigger Condition is a condition monitored by the Account Monitoring application ("Payment Status—Near Exceed") for Pre-Pay and Fixed Budget accounts. This alert is triggered when the account balance falls below an acceptable limit. The limit conditions and associated logic are implemented within the Account Monitoring application. This alert is presented with daily frequency. The alert displayed may look similar to the following Account {SUBACCOUNT_NAME}—low account balance The alert text should be hyperlinked to an Account: Add Money page and allow the user to enter an amount to add and choose credit card to charge.

The third account alert is a Credit Card Failed message. This is a high priority alert. The trigger Condition is an attempt to charge a credit card for an account and the transaction failed. This alert is generated by the Account Monitoring application ("CC-invalid") and applies to accounts with Fixed and Non-Stop budgets. The frequency of presentation of this alert is as a one-time (event). The alert displayed may look similar to the following:

Account {SUBACCOUNT_NAME} - transaction failed for credit card ending in 1234

For security purposes, only a portion of the failed credit card number is provided. The alert text should be hyperlinked to Account: Payment Method page The fourth account alert is a Credit Card Charged message. The trigger condition is that the automatic charging of a credit card for an account succeeded and the account balance was re-charged. This alert is generated by the Account Monitoring application and applies to accounts with Fixed and Non-Stop budgets. This is a one-time event, not something repeated with any frequency. The alert displayed may look similar to the following:

Account {SUBACCOUNT_NAME} has been re-charged

The alert text should be hyperlinked to Account: Payment Method page.

The fifth account alert is a Credit Card Expiring message. This is a high priority alert. The trigger Condition is that a credit card on file as a payment method for the account will expire within one month. This alert, when triggered, is presented weekly. The alert displayed may look similar to the following:

Credit card ending in 1234 will expire this month

The alert text should be hyperlinked to an Account: Payment Method page.

The sixth account alert is a Billing Information Required message. This is a high priority alert. The trigger condition occurs when the account was created and the user skipped entering credit card and contact information (i.e., user selected "Finish Later" option). This information is required for ads to be served. Presentation of this alert is a one-time occurrence. The alert displayed may look similar to the following:

Billing information and credit card required to get your ads online

The alert text should be hyperlinked to a flow which collects the missing billing information.

Editorial alerts are discussed next. High priority editorial alerts are preferably always displayed at the top of the list in the alerts summary panel. Editorial alerts are displayed and managed per unique alert event per for an account. Alerts are not managed per user per account.

Editorial Events Received—Alert Message Added

Each time an editorial event (e.g., creative is declined) comes in from the editorial processing system ("EPS") 125 (FIG. 1), the advertiser application should include the following when processing the event:

Add the editorial status event to an Editorial Status Queue

Add a message for that event to the Alert Queue, including its last modified date (i.e., date reviewed/adjudicated by EPS 125). Preferably, the advertiser application determines the item's ad group, parent campaign, and account and adds this information to the queue record.

Check whether the editorial status event causes a "higher level" alert—for example: a removed ad results in an entire ad group being taken offline—and generate the appropriate high priority alert accordingly.

Editorial Status Expires (i.e., is purged)

When an editorial status item expires and/or is purged (because it is past the retention period), preferably the system removes any associated alerts. If associated alerts are not removed, the application handles the item as a stale alert.

Note that an ad or keyword should retain its online/offline status regardless of its editorial status (which would override it). For example, if a declined creative is never edited and resubmitted, its status remains offline, as a result of the editorial status, even after the editorial status alert expires.

New alerts should be generated and displayed for all campaigns, ad groups, etc., regardless of the items' online/offline statuses. Previously generated alerts should continue to be displayed for all entities as appropriate, regardless of active or suspended status (i.e., the application will not clean up alerts as a result of status).

In the present embodiment, there are three types of editorial alerts. The first is Editorial Events (Normal Priority Alerts). The trigger condition for this alert occurs when an editorial status item or event is received from EPS 125. This occurs, for example, if an ad or keyword is declined or rejected, or removed or taken offline. This is a one time occurring alert and does not recur. Editorial events which should generate an alert include declined, removed or approved with modifications/annotations. The application will not alert on the following events:

Approved items

Pending items

Negative keywords added at any supported hierarchy level by EPS or an internal administrative user.

These alerts represent actions or change in editorial status for a campaign object such as an ad or a keyword, and are one-time static messages stored in a queue with a one-to-one correspondence with items displayed in the Editorial Status page.

The alert displayed may look similar to the following:

{"Ads" | "Keywords"} have been {declined | removed | approved with modifications}.

The alert text should be hyperlinked to the Editorial Status page, filtered by alert category appropriate for the hierarchy level being viewed. For example, an alert for "declined ads" displayed on the dashboard (FIG. 3) navigates to a view filtered for all declined ad alerts for the selected accounts. Similarly, an alert for "declined ads" displayed on the Campaign Details page navigates to a list filtered for declined ads in that campaign. Preferably, editorial alerts are aggregated by type, rather than displaying one alert for each rejected or removed ad component.

The second type of editorial alert is Account Offline—Editorial Status. The trigger condition for this alert occurs when the advertiser's account has been taken offline due to editorial status issues such as flagrant problems with the advertiser such as all URLs are non-compliant, too many resubmissions without edits, fraudulent advertising, etc.). This is a one-time event and is not recurring. The alert displayed should look similar to the following:

Your account has been turned offline due to editorial compliance issues. Please contact Customer Support.

The alert text should be hyperlinked to the Support Center main page.

The third type of editorial alert is Ad Group Offline. The trigger condition for this alert is an editorial status event, the editorial rejection or removal of the last active ad in an ad group, caused the ad group to go offline. This is a one-time event and should not recur. The alert displayed may look similar to the following:

A {declined| removed} ad has suspended an ad group.

The alert text should be hyperlinked to the Ads tab view of an Ad Group Details page.

Reminder alerts are discussed next. These serve to remind the user of a condition or situation needing attention.

The first reminder alert is Bulk Upload Processing Completed. The trigger condition occurs when a bulk upload for an account to which the user has access has been processed and imported into the account, whether with or without errors.

This does not recur but is a one-time event. The alert displayed may look similar to the following:

Campaign upload completed {successfully| with errors}

The alert should be hyperlinked to an Import Campaigns (Bulk Upload) page.

The second reminder alert is Incomplete Campaigns. The trigger condition occurs when the account(s) to which the user has access have incomplete campaigns that haven't been edited in the last several days. When a campaign is paused, canceled, deleted or expires the application checks the rest of the campaigns in the account and generates the alert if it has campaigns that satisfy the condition. The alert displayed may look similar to the following:

{SUBACCOUNT_NAME} has {TOTAL_NUMBER} incomplete campaigns

The alert should be hyperlinked to a Campaign Summary page pre-filtered to "Status=Incomplete".

The third reminder alert is No Active Campaigns. The trigger condition occurs when a campaign is paused, canceled, deleted or expires and the account has no active campaigns. If there is an existing alert of this category, the application updates its timestamp. The alert displayed may look similar to the following:

{SUBACCOUNT_NAME} has no active campaigns. The next campaign {CAMPAIGN_NAME} is scheduled to start in X days on MM/DD/YYYY.

The alert should be hyperlinked to the Campaign Summary page with the account filter set to "All Accounts".

Opportunity alerts are discussed next. Opportunities are alerts suggesting areas or changes to help optimize campaigns. Where possible, each opportunity alert includes appropriate associated actions intended to improve the performance of a campaign, etc., that isn't meeting desired performance objectives. The suggested changes might need to be taken within the application or to related facets of their marketing activities outside of the application. These opportunity alerts should be generated only for campaigns and ad groups in accounts that are online.

The various opportunity alerts have differing methods of invocation. A first type of opportunity alert is automatically generated by the application (push). A second type of opportunity alert is requested by the end-user (pull).

The first opportunity alert is Increase Budget for Better Performance. The trigger condition for this alert occurs when the Campaign Optimizer 175 (FIG. 1) runs an analysis/forecast on existing advertiser campaigns and determines that increasing the budget could enhance the performance of existing campaigns. The criteria for generating this alert are:

Campaign Optimization = ON
Campaign Budget = ON
Campaign status = active
Remaining campaign duration > 30 days
Campaign spend over the last 14 complete days ≈ 100% of campaign budget
Campaign forecast estimated impressions and/or clicks ≧ 120% of campaign historical impressions and/or clicks performance.

Other criteria may be set as well. The alerting system includes an application which compares these criteria with other data, such as data about the advertising campaign contained in the campaign data store. When the data match the criteria, the alert will be generated.

The opportunity alert as displayed may look similar to the following:

Based on the most recent available budgeting forecast, you could spend approximately
${RECOMMENDED_BUDGET_DELTA}
more on {CAMPAIGN_NAME} and generate approximately {TOTAL_NUMBER} additional impressions and {TOTAL_NUMBER} additional clicks.

When displayed on the Dashboard (FIG. 3), clicking the hyperlink {CAMPAIGN NAME} should navigate to the Campaign Details page (FIG. 4). The Alerts area 406 is expanded by default. Clicking the hyperlink budgeting forecast navigates to a Campaign Budget page. The user can then view the recommended budget and the budget landscape and make any desired changes. When displayed on the Campaign Details page, the entire alert message text should be hyperlinked to the Campaign Budget page.

The second opportunity alert is Reallocate Budget (budget too high). The trigger condition occurs when the Campaign Optimizer 175 (FIG. 1) runs an analysis/forecast on existing advertiser campaigns and determines that the budget set by the user will not or cannot be expended by the end of the campaign duration. This condition might occur due to a lack of keywords, stringent geo-targeting criteria, Max PPC Limit(s) that need to be increased, etc. The criteria for setting this alert include Campaign Optimization = ON
Campaign Budget = ON
Campaign status = active
Campaign duration remaining > 30 days (or no end date)
Campaign spend over the last 14 complete days ≦ 85% of campaign budget
Campaign forecast estimated impressions and/or clicks ≦ 110% of campaign historical impressions and/or clicks performance The opportunity alert as displayed may look similar to the following:

{CAMPAIGN_NAME} will not be able to use its entire budget. To manage your spend optimally, you should decrease its budget to ${RECOMMENDED_BUDGET}.

When displayed on the Dashboard (FIG. 3) clicking the hyperlink {CAMPAIGN_NAME} navigates to the Campaign Details page (FIG. 4). The Alerts area 406 is expanded by default. Clicking the budget hyperlink navigates to a Campaign Budget page. The user can then view the recommended budget and the budget landscape and make any desired changes. When displayed on the Campaign Details page (FIG. 3), the entire alert message text should be hyperlinked to the Campaign Budget page.

A third opportunity alert is Increase Max PPC for Better Performance. The online marketplace described herein includes concept of a recommended maximum pay per click (Max PPC), as well as the concept of the user accepting it. The system informs users of optimizer recommendations via an Opportunity alert, conveying the information that bidding higher could improve campaign performance and increase return on investment.

The trigger condition occurs when the Campaign Optimizer runs an analysis/forecast on existing advertiser campaigns and determines that Recommended Max PPC>Current Max PPC for one or more campaigns (and/or its constituent ad groups). The criteria for setting this alert include Campaign Optimization=ON Run the Campaign Optimizer on a campaign without Max PPC constraints to see what the performance would have been and generate recommended Max PPCs based on the results.

For ad groups that are inheriting Max PPC from the campaign ("default"), the opportunity should suggest increasing the value of the campaign's Default Max PPC to the value recommended by the optimizer.

For ad groups that have an overridden Max PPC ("custom"), the opportunity should suggest increasing the Default Max PPC for those ad groups to the value recommended by the optimizer.

The opportunity alert displayed may look similar to the following:

You might be able to improve the performance of Campaign X without increasing budget; check out these Max PPC recommendations.

Clicking the hyperlink Campaign X navigates to the Campaign Details page. Clicking the hyperlink Max PPC recommendations navigates to page that includes historical analytics over the last 30 days compared to forecast performance over the next 30 days if the recommendation is accepted for the campaign and its ad groups, as follows:

ads (creatives) in the Account, based on the ads' aggregate quality score for the ad group.

The logic for implementing this alert is as follows:

Ad editorial status = approved
Ad online status = active
Ad quality score is "low" (whatever that means)
Campaign and Ad Group status = active
Campaign duration remaining > 15 days (or no end date)

This opportunity has not been requested for the account within the last 30 days

The opportunity alert displayed may look similar to the following:

Some ads are not performing well.

The alert text should be hyperlinked to a list of the ads that were identified. The user also should be able to select a date range over which to view the analytics.

A fifth opportunity alert is Keyword Pruning/Adtermlisting Removal. The application has embedded logic that suggests opportunities for users to prune inactive, non-performing, etc., keywords or adtermlistings from their account. As a result, the user has the option to remove keywords from an ad group or set adtermlistings offline. The alert displayed may look similar to the following:

{TOTAL_NUMBER} poorly performing ads in your account

The alert text should be hyperlinked to a list of the adtermlistings that were identified. In addition, the application may also show the user the Max PPC required to get the term into position 1 and/or the lowest Max PPC required to get them some activity (clicks/impressions). Also, the application may indicate if there is no opportunity for activity (clicks/impressions).

| Name | | Max PPC | Avg. CPC | Avg. Pos. | Impr. | Clicks | Conv. | CPA | Rev. | ROSA | Spend |
|---|---|---|---|---|---|---|---|---|---|---|---|
| ☐ Campaign X | Current | 1.23 | 1.23 | 25 | 349348 | 5389 | 348 | 9.44 | 31,875 | 845 | 2277 |
| | Recomm. | 1.64 | 1.64 | 22 | 894583 | 7639 | 482 | 9.76 | 44,238 | 1040 | 2643 |
| Default PPC Ad Group 1 | Current | 1.23 | 1.23 | 25 | 349348 | 5389 | 348 | 9.44 | 31,875 | 845 | 2277 |
| | Recomm. | | | 22 | 894583 | 7639 | 482 | 9.76 | 44,238 | 1040 | 2643 |
| Default PPC Ad Group 2 | Current | 1.23 | 1.23 | 25 | 349348 | 5389 | 348 | 9.44 | 31,875 | 845 | 2277 |
| | Recomm. | | | 22 | 894583 | 7639 | 482 | 9.76 | 44,238 | 1040 | 2643 |
| Etc. | Current | 1.23 | 1.23 | 25 | 349348 | 5389 | 348 | 9.44 | 31,875 | 845 | 2277 |
| | Recomm. | | | 22 | 894583 | 7639 | 482 | 9.76 | 44,238 | 1040 | 2643 |
| ☐ Custom PPC Ad Group 1 | Current | 1.23 | 1.23 | 25 | 349348 | 5389 | 348 | 9.44 | 31,875 | 845 | 2277 |
| | Recomm. | 1.64 | 1.64 | 22 | 894583 | 7639 | 482 | 9.76 | 44,238 | 1040 | 2643 |
| ☐ Custom PPC Ad Group 2 | Current | 1.23 | 1.23 | 25 | 349348 | 5389 | 348 | 9.44 | 31,875 | 845 | 2277 |
| | Recomm. | 1.64 | 1.64 | 22 | 894583 | 7639 | 482 | 9.76 | 44,238 | 1040 | 2643 |
| ☐ Etc. | Current | 1.23 | 1.23 | 25 | 349348 | 5389 | 348 | 9.44 | 31,875 | 845 | 2277 |
| | Recomm. | 1.64 | 1.64 | 22 | 894583 | 7639 | 482 | 9.76 | 44,238 | 1040 | 2643 |

Other processing may be substituted. The user can select one or more items and accept the recommended Max PPCs, or click on the item name to navigate to its details page.

A fourth opportunity alert is Low Quality Ads. The trigger condition for this alert is based on application logic that runs when requested by the user and identifies poorly performing A sixth opportunity alert is Move Poor Performing/Less Relevant Keywords Out of an Ad Group. The trigger condition for this alert is based on application logic that suggests opportunities for users to split up an ad group when there is a significant divergence in the performance among its keywords, due to relevance, etc. For example, if an ad group consists of keywords relating to both laptops and fishing rods, the creative may not work equally well with both sets of terms. If relevance—and therefore performance—is materially better for the keywords related to fishing rods, the opportunity would suggest that the user move the poorer performing keywords into a separate ad group.

The alert displayed may look similar to the following:

---

Ad group {NAME} contains keywords that might perform better with different ads. Consider moving them to a separate ad group.

---

The alert text is hyperlinked to a list of the keywords that were identified as candidates for being split out of the ad group. The user is able to select and move them to an existing or new ad group (which can be created during the moving process).

A sixth opportunity alert is Sales Proposal Available. The trigger condition for this opportunity alert occurs when the advertiser's account manager, sales representative, etc., has created a new sales proposal (i.e., new campaign(s), ad groups, etc., to add to the advertiser's account) and the user needs to review and approve it. When the proposal is created by the account manager, he will generate a new alert for the account via customer relationship management software or some other internal administrative tool.

The alert displayed may look similar to the following:

New proposal is available

The alert text should be hyperlinked to the Sales Proposal Details page, which is a cover page that includes a message (e.g., from the account manager to the advertiser), general information, etc., and links to the items (campaigns, etc.) in the proposal.

In some embodiments, performance alerts may be set as well. Performance alerts can be set for an individual campaign, for an individual ad group and as a blanket alert set at the campaign level (which applies to all ad groups in the campaign). Users cannot turn off blanket campaign-level alerts at the ad group level. If an alert is set as a blanket condition at a higher level in the hierarchy, it is set by reference and should automatically apply to any new campaigns or ad groups that are created beneath that hierarchy level at any time after the alert has been defined.

The table below illustrates the options for configuring alerts, as well as the alerts that should be displayed, in the Manage Alerts page at each level in the hierarchy:

| Level | Options available when setting campaign/ad group alerts at this level | Manage Alerts page at this level should display ... |
|---|---|---|
| Campaign | ☑This Campaign<br>☑All Ad Groups in this Campaign | Alerts for this Campaign<br>Campaign-wide ad group alerts |
| Ad Group | ☑This Ad Group | Campaign-wide ad group alerts<br>Alerts for this Ad Group |

The Campaign-wide ad group alerts are displayed in the Manage Alerts page. Users can view but not edit the details for these alerts at the various levels. Alerts for a specific campaign or ad group can be created or edited by any user who has write access to the campaign/ad group. Alerts apply to live campaigns only with all computations measured over the duration specified by the user. Ad group alerts are similar to those at the campaign level, except they apply only to criteria at the ad group level.

The application also implements logic for checking performance alert conditions. User-defined alerts apply only to marketing activities (adtermlistings) for managed tactics (i.e., Sponsored Search and Content Match); they do not apply to activities that are tracked for analytics/reporting purposes. User-defined performance alerts must be aware of campaign schedules so as not to alert the user inappropriately (e.g., before the campaign is active, when the campaign has been paused too long). The rules and conditions for user-defined alerts should be checked based on the campaign/ad group velocity.

For configuring and managing performance alerts, the user accesses a manage alerts page. The Manage Alerts page displays a list of user-defined alerts and allows the user to manage and delete existing alerts and add new ones. An Alerts List contains a list of user-defined alerts for the selected entity. Note that for ad groups, the list contains campaign-level blanket alerts as well as those set for the individual ad group.

| | Alert Name | Status | Priority | Level Set At | Type | Created by | Modified |
|---|---|---|---|---|---|---|---|
| ☐ | Alert A | On | High | Campaign | Performance - CPA | Sara User | mm/dd/yyyy |
| ☐ | Alert B | Off | Normal | Ad Group | Peformance - ROAS | Joe User | mm/dd/yyyy |
| ☐ | Alert C | On | Normal | Campaign | Deviance - CTR | Mike User | mm/dd/yyyy |
| ☐ | Alert D | Off | Low | Campaign | Deviance - CPC | Sara User | mm/dd/yyyy |
| | Etc. | | | | | | |

When managing alerts for an ad group, the user can see but not edit the blanket alerts set at campaign level. For example, if the list above was for an ad group, the user could only edit/delete Alert B—but not A, C and D—since those are defined for the ad group at its parent campaign level.

With respect to filter, the user should be able to filter on the following:

Alert Name (contains, starts with, equals)
Level Set At
Type (Performance, Deviance)
*Created by (contains, starts with, equals)

Date Modified

Actions available on the Manage Alerts page include:

Alert Name—clicking the hyperlinked alert name navigates to the Alert Details page.

Activate—set selected alerts active

Deactivate—set selected alerts as inactive

Create—create new alerts from scratch for the selected entity.

Delete—delete selected (checked) alerts for the entity. Alerts already being displayed should be removed (or not; it's not critical)

User-defined alerts are may be defined using a template in which the user sets threshold for a metric(s) that apply generally to the campaign and/or its ad groups. An example of a template is the following:

Details for Alert X

Alert Name [          ]

Alert Status
- ⊙ Active
- ○ Inactive

Where To Apply This Alert
- ☑ This Campaign
- ☐ All Ad Groups in this Campaign

Priority
- ○ High
- ⊙ Normal
- ○ Low

Alert Type
- ⊙ Deviance from Business Objectives
- ○ Change in Performance

Alert Conditions

[Submit]  [Cancel]  [Delete This Alert]

Clicking Submit saves the alerts and returns to the referring page (e.g., Manage Alerts, Campaign Details). Clicking Cancel discards user changes and returns to the referring page. Clicking Delete deletes the alert and returns to the referring page.

Available options, default values and validation rules when creating a new alert are shown in the following table.

| Field | Options/Validation | Default Value |
|---|---|---|
| Alert Name | N/A | BLANK |
| Alert Status | Options:<br>Active<br>Inactive | Active |
| Alert Type | Options:<br>Deviance from Business Objectives<br>Change in Performance<br>Only one condition/rule per user-defined alert | None selected |
| Alert Priority | Options:<br>High<br>Normal<br>Low | Normal |
| Where To Apply This Alert | Campaign level:<br>☑This Campaign<br>☑All Ad Groups in this Campaign<br>Ad Group level:<br>☑This Ad Group | None selected<br><br><br><br>"This Ad Group" |

An alert becomes "stale" when the condition about which it was notifying the user is no longer true. For example, an Account—Low Balance alert was created and the user has added money, so the account balance is no longer low. In another example, an Editorial Status alert was created and the item's status has changed. For example, the Creative for an ad was declined by EPS, the user edits the Creative, and now the Creative is pending; or, in another example, the declined Creative is deleted by the user; or the keyword for a declined or removed ad/term is deleted by the user.

If the user clicks on a stale alert, the application navigates to the usual page for the alert (as specified herein above), or redirects the user's browser appropriately. The table below describes how stale alerts are handled by alert category:

| Alert Category | What happens when user clicks a stale non-dynamic alert of this category |
|---|---|
| System | No need redirect; just navigate to the usual page for the alert. |
| Account | No need to redirect; just navigate to the usual page for the alert. |
| Editorial Status | If the item's editorial status is now pending (e.g., was edited and resubmitted) or approved, or if the editorial status item has been purged, redirect to the details page for the associated item with a message indicating that the editorial status has changed.<br>For example, let's say an ad is declined and an alert is created. The user then edits the ad and it is resubmitted to Editorial. When a user then clicks on the alert (which would read, "Some of your ads have been declined"), we should redirect him to the "Ads" tab in the Ad Group Details page rather than navigating to the Editorial Status alert details page. |
| Reminder | No need to redirect; just navigate to the usual page for the alert. |
| Opportunity | No need to redirect; just navigate to the usual page for the alert. |

A View all Alerts page is provided. This page lists all alerts of all categories for all accounts available to the logged-in user, and it may be pre-filtered depending on how the user navigated to the page. Filters available on this page are as follows:

| Alert Category ▼ | Priority ▼ | Account ▼ | Level ▼ | Name | Date |
|---|---|---|---|---|---|
| All | All | All Accounts | Account | Contains | {DATE_RANGE} |
| Account | High | Account 1 | Campaign | Equals | |
| Editorial | Normal | Account 2 | Ad Group | | |
| Reminder | | Account 3 | | | |
| Opportunities | | | | | |

Search results and bulk actions available are:

Alert Actions ▼
Delete

| ☐ | ! | Alert Subject ⇩ | Category ⇩ | Date ⇩ |
|---|---|---|---|---|
| ☐ | | Alert 1 subject text | Account | mm/dd/yy hh:mm |
| ☐ | ℗ | Alert 2 subject text | Editorial | mm/dd/yy hh:mm |
| ☐ | | Alert 3 subject text | Reminder | mm/dd/yy hh:mm |
| ☐ | | Etc. | | |

<< first < previous | 1 2 3 | next > last >>

Alert subject text is hyperlinked to the same destination pages as for the alert detail item displayed in other pages (e.g., Dashboard, FIG. 3, Campaign Details, FIG. 4). For example, editorial alerts navigate to the appropriate Editorial Status Item Details page, Low Account Balance alerts navigate to the Add Money page. Ad Group name is hyperlinked to an Ad Group Details page for the appropriate ad group.

The user needs to delete an alert to remove it from the list; it does not disappear automatically after being viewed.

The default date range when navigating to the View All Alerts page should be the last X days, where X equals the maximum retention period for alerts.

Alert Summary Panel—display and filtering

The table below shows where the different types of alerts are displayed to users of all roles. All alerts are filtered for the user based on account access permissions defined in the account, if applicable. Alerts displayed on Campaign/Ad Group/Keyword details pages are filtered to apply to the current object and its child objects below it in the hierarchy.

In summary, the general rules for displaying generated alerts are as follows:

System alerts should be displayed on all pages in the application, at the top of the page.

Account alerts should be displayed on the Dashboard.

Editorial alerts should be displayed on the Dashboard and campaign management pages and should be filtered to include only those relevant to the current object or children within its branch of the campaign hierarchy.

Reminder alerts should be displayed on the Dashboard.

Opportunity alerts should be displayed on the Dashboard and campaign management pages, and should be filtered so that as the user drills down to lower levels of the hierarchy (e.g., from Dashboard to campaign and then to ad group), the user will see only alerts specific to the object(s) at those levels. For example, the Dashboard should display all available performance alerts for the filtered account(s), where the Campaign Details page will display a list of alerts related to that campaign (and its children), and so on.

Alerts and Associated Destination Pages

The table below illustrates the pages to which the various alerts should be linked and the ones on which they are displayed.

| Category | Type | Destination Page | High Priority | Dash-board |
|---|---|---|---|---|
| System | System Status Messages | N/A | | 8 |
| | Books Closed Warning | N/A | | ✓ |
| | Analytics Tag Data Not Received | Account: Tag Settings | ℗ | ✓ |

-continued

| | | | | |
|---|---|---|---|---|
| Account | Account Offline - Balance Exceeded | Account: Add Money | ℙ | 8 |
| | Account Balance Low | Account: Add Money | ℙ | 8 |
| | Credit Card Failed | Account: Payment Method | ℙ | ✓ |
| | Credit Card Charged | Account: Payment Method | | ✓ |
| | Credit Card Expiring | Account: Payment Method | | ✓ |
| | Billing Information Required | Account: Account Details | ℙ | 8 |
| Editorial | Account Offline - Editorial Issues | Support Center | ℙ | 8 |
| | Ad Group Offline | Ad Group Details for that ad group | ℙ | ✓ |
| | Declined Ads/Keywords | Editorial Status filtered for editorial status type and object level | | ✓ |
| | Removed Ads/Keywords | Editorial Status filtered for editorial status type and object level | | ✓ |
| | Ads approved with modifications/annotations | Editorial Status filtered for editorial status type and object level | | ✓ |
| Reminder | Bulk Ad Upload Completed | Account: Import Campaigns (a.k.a. Bulk Upload) | | ✓ |
| | Incomplete Campaigns | Campaign Summary filtered for "Status = Incomplete" | | ✓ |
| | No Active Campaigns | Campaign Summary filtered for "All Accounts" | | ✓ |
| Opportunities | Increase Budget for Better Performance | Campaign Details on Dashboard Campaign Budget on Campaign Details | | ✓ |
| | Reallocate/Reset Budget (budget too high) | Campaign Details on Dashboard Campaign Budget on Campaign Details | | ✓ |
| | | | P ordered by: | Selected Account(s) |

| Category | Type | Campaign Summary | Campaign Details | Ad Group Details | Keyword Details | Other pages |
|---|---|---|---|---|---|---|
| System | System Status Messages | 8 | 8 | 8 | 8 | 8 |
| | Books Closed Warning | N/A | N/A | N/A | N/A | Reports |
| | Analytics Tag Data Not Received | ✓ | X | X | X | X |
| Account | Account Offline - Balance Exceeded | 8 | 8 | 8 | 8 | 8 |
| | Account Balance Low | 8 | 8 | 8 | 8 | 8 |
| | Credit Card Failed | X | X | X | X | X |
| | Credit Card Charged | X | X | X | X | X |
| | Credit Card Expiring | X | X | X | X | X |
| | Billing Information Required | 8 | 8 | 8 | 8 | 8 |
| Editorial | Account Offline - Editorial Issues | 8 | 8 | 8 | 8 | 8 |
| | Ad Group Offline | X | ✓ | ✓ | X | X |
| | Declined Ads/Keywords | X | ✓ | ✓ | ✓ | X |
| | Removed Ads/Keywords | X | ✓ | ✓ | ✓ | X |
| | Ads approved with modifications/annotations | X | ✓ | ✓ | ✓ | X |
| Reminder | Bulk Ad Upload Completed | X | X | X | X | X |
| | Incomplete Campaigns | X | X | X | X | X |
| | No Active Campaigns | X | X | X | X | X |
| Opportunities | Increase Budget for Better Performance | X | ✓ | X | X | X |
| | Reallocate/Reset Budget (budget too high) | X | ✓ | X | X | X |
| | | Selected Account(s) | Current Campaign | Current Ad Group | Current Keyword | Selected Account(s) |

A variety of Alert Notifications are available in the present system. The alert notifications feature supports individual delivery options for important alerts by alert category. In a first category, an Alert Summary E-mail is a once daily delivery of an e-mail summarizing new alerts, where new in this context means since last notification e-mail was sent). In a second category, an Instant Notification is a substantially real-time notification of high priority alerts via e-mail (with support for Instant! Messenger, mobile devices, et al., also available). The user can select the categories of alerts to be notified about. Notification is configured per user per account, and is stored as a user preference. A configuration page such as the user interface 500 of FIG. 5 is available from a Preferences page.

Available options, default values and validation rules when creating a new alert are summarized in the following table:

| Field | Options | Default Value |
|---|---|---|
| Daily Alert Summary | | |
| Notification is. | On<br>Off | On |
| Alert categories to include: | Account<br>Editorial<br>Reminder<br>Opportunities | None selected |
| Deliver e-mail to: | E-mail address in profile<br>Other e-mail address (text entry) | E-mail address in profile |
| Send the e-mail with this priority: | High<br>Normal<br>Low | Normal |

-continued

| Field | Options | Default Value |
|---|---|---|
| Instant Notification | | |
| Notification is | On<br>Off | Off |
| Alerts to include | Indivdual selection of high priority alerts for each alert category | None selected |
| E-mail address for delivery: | Address in profile<br>Other (text entry) | Address in profile |

The Daily Alert Summary is sent once a day (approximately once every 24 hours) and includes all alerts for the account generated since the last summary e-mail was sent. The summary includes all alerts that qualify, including those for which the application has also sent an instant notification. Alert notification e-mails are sent only for alerts in the accounts to which the user has access.

To ensure that at least one user for the account receives notification of certain important alerts (as deemed by the operational systems that manage conditions related to the alert, such as Account Monitoring or the Editorial Processing System), the application implements the notification sending logic as follows:

If at least one user is subscribed to an alert notification for which we want to always send a notification e-mail, we send it to those users.

If no users are subscribed to an alert notification for which we always want to send a notification e-mail, then we should send it based on the following logic:

For Sales accounts: send notification to the YSM Account Manager listed for the account For Self-serve accounts: send notification e-mail message to the default user for that alert type (e.g., account primary contact or billing contact), based on the embedded system default rule for that alert. Note that the recipient could vary for different rules.

EXAMPLE

Assume an account has two users, Abel (who is the account billing contact) and Baker. In the alert notification settings, Abel chooses not to receive either the instant or summary account notifications, while Baker elects to receive all alerts via these notifications. The Account Monitoring component detects that the account balance is low for the account and needs to send the "Low Account Balance" notification. Even though he is the billing contact, Able will not receive either an instant notification or daily summary (because he is not subscribed). Baker will receive instant notification and daily summary because he is subscribed. When either user logs in to the advertiser application, they will both see the alert displayed in dashboard.

For editorial alert emails, each account primary contact receives two daily automated email messages containing editorial alerts if applicable for the following editorial actions:

Removed or modified components ("Scrub")

Alerts regarding new ad content that was submitted for editorial review ("Submission Status")

Within the application, several operational provisions have been made. The application retains editorial status items/events (i.e., available in the Editorial Status page) for 30 days and retains alerts for at least 30 days. When an alert is generated, even for a duplicate alert, for an account, the application audits the event and captures the following data:

Event type: Alert Type

Description: Alert Text, including specific objects, specific data about those objects (e.g., recommended budget for an opportunity alert)

Datetime the alert was generated

Account hierarchy object for which the alert was generated

FIG. 6 is a block diagram of one embodiment of a system 600 for providing advertisement campaign information about an advertisement campaign to an advertiser. The system 600 typically comprises an advertisement service provider 602 (advertisement campaign management system) comprising one or more servers in communications with a user device 604 over a network 606. Generally, an advertisement service provider 602 organizes advertisement campaign information into an account hierarchy, as described above, according to a user account, one or more ad campaigns associated with the user account, one or more ad groups associated with the ad campaigns, and keyword and advertisement information associated with the ad groups. After organizing the advertisement campaign information, the advertisement service provider 602 sends at least a portion of the advertisement campaign information to the user 604 for display based at least in part on the one or more ad groups.

Each server of the advertisement service provider 602 may comprise a processor 608, a network interface 610 in communication with the processor 608, and a memory unit 612 in communication with the processor 608. Typically, the memory unit 612 stores at least advertisement campaign information. Advertisement campaign information may comprise information relating to relationships between a user account, ad campaigns, and ad groups; performance parameters associated with a user account, ad campaigns, and ad groups; or advertisements and keywords associated with a user account, ad campaigns, and ad groups.

The processor 608 is typically operative to perform one or more operations to organize the advertisement campaign information stored in the memory unit 612 into one or more ad groups as defined by an advertiser. As described above, an ad group may be thought of as a conceptual compartment or container that includes advertisements and parameters for advertisements that are handled in a similar manner.

After organizing the advertisement campaign information into one or more ad groups, the advertisement service provider 602 may send at least a portion of the advertisement campaign information to the user device 604 via the network interface 3210 for display based at least in part on the one or more ad groups. In one embodiment, the advertisement service provider 602 sends one or more hypertext pages that comprise a graphical user interface such as those in FIGS. 3-5 when the one or more hypertext pages are executed in an internet-browser, stand-alone application, or any other device known in the art.

FIG. 7 is a flow diagram of one embodiment of a method for providing advertisement campaign information about an advertisement campaign to an advertiser. The method begins at block 700. At block 702, the method includes organizing advertising campaign information into ad groups. At block 704, the method includes receiving advertiser inputs which define an alert. At block 706, advertisement campaign account data are stored. For example, about impressions, click throughs an post-click actions are stored in the campaign data store. At block 708, the system alert is produced based on the one or more ad groups. The method subsequently ends.

From the foregoing, it can be seen that the present embodiments provide a method and system for reporting on advertisements and the advertiser's accounts. A system for managing advertisements includes a reporting system which receives advertiser inputs and data defining interactions with advertisements organized in accounts, campaigns and ad groups. The reporting system uses these input sources and produces computer-based reports illustrating the status and historical success of the advertiser's advertisements. The reports are readily varied and updated to show a variety of aspects of the success of the advertisements.

It is therefore intended that the foregoing detailed description be regarded as illustrative rather than limiting, and that it be understood that it is the following claims, including all equivalents, that are intended to define the spirit and scope of this invention.

The invention claimed is:

1. A method for providing advertisement information about an advertisement campaign to an advertiser, the method comprising:

using a server, collecting advertisement information from an advertisement campaign service provider;

in response to input information received at the server from an advertiser, organizing the collected advertisement information into at least one advertising campaign, organizing the at least one advertising campaign into at least two ad groups, and organizing at least one of the ad groups into a plurality of advertising tactics including search result listings, banner advertisements and content match, the at least one of the ad groups including at least two advertisements, each of the at least two advertisements being a part of a respective specified advertising tactic, wherein each ad group includes respective advertiser-specified ad group parameters and each of the at least two advertisements includes respective advertiser-specified ad parameters, each ad group organized so that changes made to the respective ad group parameters of a selected ad group will apply to the respective ad parameters of all advertisements in the selected ad group;

using the server, receiving commands entered via the graphical user interface at a user device to select predetermined graphical and tabular displays of advertisement information at the user device;

using the server, sending a portion of the collected advertisement information from the advertisement campaign management system to a graphical user interface operated in conjunction with the user device for display to a user, including arranging the portion of the collected advertisement campaign information into a user interface arrangement displaying graphical and tabular summaries of the collected advertisement information according to the received commands for display in a format based on organization of the advertisement information into at least one advertising campaign, at least two ad groups and a plurality of advertising tactics;

using the server of the advertisement management system, receiving advertiser inputs via the graphical user interface defining a system alert to be provided to the advertiser upon occurrence of an event defined by the system alert, the system alert defining one or more advertising campaigns, ad groups or advertising tactics which are subject to the system alert;

in response to the received advertiser inputs, at the server, monitoring to detect occurrence of the event defined by the system alert; and when the event occurs, providing data to produce the system alert on the graphical user interface about performance of the advertisement campaign for the one or more advertising campaigns, ad groups or advertising tactics which are subject to the system alert.

2. The method of claim 1 wherein receiving advertiser inputs comprises:

receiving an indication entered via the graphical user interface at the user device to provide a daily alert summary, and further comprising:

providing data to produce on the graphical user interface the daily alert summary including alerts for the one or more advertising campaigns, ad groups or advertising tactics which are subject to the system alert.

3. The method of claim 1 wherein receiving advertiser inputs comprises:

receiving an indication entered via the graphical user interface to provide instant notification for specified alerts, and further comprising:

providing data to produce on the graphical user interface the instant notification including alerts for the one or more advertising campaigns, ad groups or advertising tactics which are subject to the system alert.

4. A system for providing advertisement campaign information about an advertisement campaign to an advertiser, the system comprising:

an advertisement campaign management system configured to store advertisement campaign information for a plurality of advertisers, respective advertisement campaign information being organized by a respective advertiser into at least one advertising campaign, the at least one advertising campaign being organized into at least two ad groups, at least one of the ad groups being organized into a plurality of advertising tactics including search result listings, banner advertisements and content match, the at least one of the ad groups including at least two advertisements, each of the at least two advertisements being a part of a respective advertising tactic, wherein each ad group includes respective ad group parameters and each of the at least two advertisements includes respective ad parameters, each ad group organized so that changes made to the respective ad group parameters of a selected ad group will apply to the respective ad parameters of all advertisements in the selected ad group;

a web interface in data communication with the advertisement campaign management system and configured to receive advertiser inputs from the respective advertiser, the advertiser inputs including display-defining inputs specifying graphical and tabular presentation of advertiser-specified parameters, the display-defining inputs specifying filters that control display of information based on advertiser selections of advertising campaign, ad group and advertising tactic, the web interface further being configured to provide system alerts about the advertisement campaign information to the advertiser based on the received display-defining inputs the system alerts defining one or more advertising campaigns, ad groups or advertising tactics which are subject to the system alerts;

a campaign data store configured to store advertisement campaign account data; and an alerting system in data communication with the campaign data store and the web interface to produce the system alerts about performance of the advertisement campaign and provide a visual report based on the display-defining inputs to the web interface, the system alerts being based on the organization of the advertisement campaign information into the at least one advertising campaign, the at least two ad groups and the plurality of advertising tactics.

5. The system of claim 4 wherein the alerting system comprises a user interface having user actuated inputs to control production of the system alerts about the performance of the advertisement campaign.

6. The system of claim 4 wherein the alerting system comprises:
   an application to compare criteria for providing a system alert with stored advertisement campaign account data; and
   an application to provide the system alert when the criteria are met.

7. The system of claim 4 wherein the alerting system comprises:
   an application to create a performance alert for an individual campaign.

8. The system of claim 7 wherein the alerting system comprises:
   an application to create a performance alert for an individual ad group.

9. The system of claim 7 wherein the alerting system comprises:
   an application to create a performance alert as a blanket alert set at a campaign level and which applies to all ad groups in a campaign defined by the campaign level.

* * * * *